United States Patent [19]
Bounnakhom et al.

[11] Patent Number: 5,996,810
[45] Date of Patent: Dec. 7, 1999

[54] FLUID FILTER ASSEMBLY

[75] Inventors: Alan S. Bounnakhom; Dwight S. Suiter; A. Caner Demirdogen; Paul D. Miller, all of Cookeville; Mike B. Lanius, Baxter, all of Tenn.

[73] Assignee: Fleetguard, Inc., Nashville, Tenn.

[21] Appl. No.: 08/899,686

[22] Filed: Jul. 24, 1997

[51] Int. Cl.$^6$ .................................................. B01D 27/08
[52] U.S. Cl. .................. 210/443; 210/450; 210/DIG. 17
[58] Field of Search ..................................... 210/440, 443, 210/444, 450, DIG. 17, DIG. 13

[56]      References Cited

U.S. PATENT DOCUMENTS

| | | |
|---|---|---|
| 1,033,858 | 7/1912 | Adams . |
| 1,647,799 | 11/1927 | Hammer . |
| 2,646,886 | 7/1953 | Le Clair . |
| 2,743,019 | 4/1956 | Kovacs . |
| 3,000,506 | 9/1961 | Hultgren ................................. 210/133 |
| 3,204,771 | 9/1965 | Baldwin . |
| 3,719,281 | 3/1973 | Dieringer ................................ 210/440 |
| 3,859,216 | 1/1975 | Sisson et al. . |
| 4,052,307 | 10/1977 | Humbert, Jr. . |
| 4,622,136 | 11/1986 | Karcey . |
| 4,740,299 | 4/1988 | Popoff et al. . |
| 4,832,844 | 5/1989 | Ayers . |
| 4,839,037 | 6/1989 | Bertelsen et al. . |
| 4,841,628 | 6/1989 | Nagle . |
| 4,855,047 | 8/1989 | Firth . |
| 4,992,166 | 2/1991 | Lowsky et al. . |
| 5,118,417 | 6/1992 | Deibel . |
| 5,171,430 | 12/1992 | Beach et al. . |
| 5,256,285 | 10/1993 | Tomita et al. . |
| 5,300,223 | 4/1994 | Wright . |
| 5,301,958 | 4/1994 | Covington . |
| 5,302,284 | 4/1994 | Zeiner et al. . |
| 5,342,519 | 8/1994 | Friedmann et al. . |
| 5,362,390 | 11/1994 | Widenhoefer et al. . |
| 5,390,701 | 2/1995 | Lessley et al. . |
| 5,395,518 | 3/1995 | Gulsvig . |
| 5,445,734 | 8/1995 | Chen . |
| 5,489,384 | 2/1996 | Janik et al. ............................. 210/436 |
| 5,490,930 | 2/1996 | Krull ....................................... 210/443 |
| 5,525,226 | 6/1996 | Brown et al. . |
| 5,548,893 | 8/1996 | Koelfgen . |
| 5,695,637 | 12/1997 | Jiang et al. ............................. 210/440 |

FOREIGN PATENT DOCUMENTS

| | | |
|---|---|---|
| 1165203 | 10/1958 | France . |
| 593874 | 5/1959 | Italy . |
| 213194 | 10/1962 | Sweden . |
| 2 220 866 | 1/1990 | United Kingdom . |

OTHER PUBLICATIONS

*HMKO3 Fluid Filter High Pressure*; Product bulletin of Donaldson Company, Inc.; Bulletin No. 1200–479 (Rev Mar. 1992); copyright 1992; 4 pages (not numbered).

*Primary Examiner*—Matthew O. Savage
*Attorney, Agent, or Firm*—Woodard, Emhardt, Naughton Moriarty & McNett

[57]          ABSTRACT

A fluid filter assembly which is constructed and arranged to threadedly mount onto an engine block mounting base includes an enclosing outer shell, a filtering element positioned within the outer shell so as to define an annular clearance space between the outer shell and the filtering element. A nutplate is assembled to the outer shell so as to close the outer shell and provide an internally-threaded mounting portion for attachment to the engine block mounting base. The sidewall which defines the threaded mounting portion is free of any flow openings therethrough. A seal arrangement including an inner seal positioned between the nutplate and the filter element and an outer seal positioned between the engine block mounting base and the nutplate is provided as part of the fluid filter assembly. The nutplate and inner seal are designed to cooperate with each other so as to define a plurality of flow passageways extending between the nutplate and inner seal and providing a flow path from the engine block mounting base to the annular clearance space.

20 Claims, 16 Drawing Sheets

FLUID FILTER ASSEMBLY

BACKGROUND OF THE INVENTION

The present invention relates in general to the design of a fluid filter which includes a stamped steel nutplate for threaded attachment to a filter head. More specifically, the present invention relates to a fluid filter design wherein the nutplate has a threaded aperture which is larger, compared to earlier designs, in order to provide a reduced moment arm. Included in the disclosed design of the present invention are novel inner and outer seals which provide improved performance characteristics. The anticipated use for the present invention is in cooperation with a vehicle engine such as a diesel engine.

A related embodiment of the present invention is directed to the spin-on filter and the filter head interface. More specifically, this related embodiment includes a design relationship for the specific sequence of thread and seal (inner and outer) engagements between the fluid filter and the filter head in order to facilitate easier installation.

While the design of fluid filters over the years has involved literally hundreds of different concepts, the basic principles of operation have remained much the same. The fluid substance to be filtered must first be introduced into the filter housing or shell and from there directed to flow into and through the filtering media. As the filtered fluid exits from the filtering media, it needs to be routed to a flow outlet. Throughout this flow loop, it is generally preferred that the unfiltered fluid not by-pass the filtering media and that fluid not leak from the filter shell. While these functions can normally be achieved by the use of properly designed and positioned seals, over time seals deteriorate and leakage can occur. The passage of time and continued use can also cause deterioration of other components and interfaces within the fluid filter. For example, each pulse of fluid pressure creates a variable load on the nutplate causing it to flex. The flexing of the nutplate creates wear in the plate and weakens nutplate interfaces and deterioration begins. In particular, the flexing causes the outer seal to deflect which in turn can create a leakage interface. To some extent the rate of deterioration is affected by the operating environment and the nature of the substance being filtered. If a longer service interval is desired for the filter assembly, it is important to be able to slow the rate of deterioration.

In order to provide a representative sampling of earlier fluid filter assembly designs, the following listed patents should be considered:

| U.S. Pat. No. | PATENTEE | ISSUE DATE |
|---|---|---|
| 4,841,628 | Nagle | Jun. 27, 1989 |
| 4,839,037 | Bertelsen et al. | Jun. 13, 1989 |
| 4,855,047 | Firth | Aug. 8, 1989 |
| 5,118,417 | Deibel | Jun. 2, 1992 |
| 5,548,893 | Koelfgen | Aug. 27, 1996 |
| 4,992,166 | Lowsky et al. | Feb. 12, 1991 |
| 5,171,430 | Beach et al. | Dec. 15, 1992 |
| 5,395,518 | Gulsvig | Mar. 7, 1995 |
| 4,052,307 | Humbert, Jr. | Oct. 4, 1977 |
| 1,033,858 | Adams | Jul. 30, 1912 |
| 2,646,886 | Le Clair | Jul. 28, 1953 |
| 2,743,019 | Kovacs | Apr. 24, 1956 |
| 3,859,216 | Sisson et al. | Jan. 7, 1975 |
| 5,300,223 | Wright | Apr. 5, 1994 |
| 5,445,734 | Chen | Aug. 29, 1995 |
| 1,647,799 | Hammer | Nov. 1, 1927 |

In those diesel engine filter designs which employ an internally threaded nutplate, one of the design concerns is the type and level of vibration which the filter assembly sees in its actual use environment. In a typical installation, the fluid filter assembly is threadedly attached to a mounting base or filter head. The filter head typically provides the flow passages for the incoming (unfiltered) fluid as well as a flow passage for the exiting (filtered) fluid. An externally threaded, hollow stem is typically used in order to threadedly mate with an internally threaded aperture in the nutplate. Since the threaded stem is hollow, it is constructed and arranged to function as an exit flow passage or conduit.

Vibrations due to engine operation and those coming from road conditions are transmitted to the fluid filter assembly by means of the filter mounting base and the threaded stem. The distance from the outside diameter of the threaded stem to the filter housing (i.e., shell) defines a moment arm about which the filter assembly is able to move. The greater the length of the moment arm, the greater the amplitude of the transmitted vibrations and the greater the rate of deterioration of the seals of the fluid filter assembly and in turn the greater the rate of deterioration of the filter assembly. Vibrations of the type described also have a deterioration effect on the seals, the nutplate and other structural components of the fluid filter. In order to increase the useful life of the fluid filter assembly, it would be desirable to reduce the length of the moment arm. This is accomplished by the present invention by increasing the size of the internally threaded aperture in the nutplate and in turn by providing an internally-threaded mounting portion with an increased outside diameter.

By employing a nutplate with the same outside diameter, an increase in the inside diameter size reduces the radial thickness or width of the nutplate sidewall and in turn reduces the available area which can be used for drilling, molding, or otherwise incorporating fluid flow holes. The inside and outside diameters of the nutplate define the sidewall which has an annular ring shape. While flow holes could conceivably be provided in this annular ring area, each flow hole would, by necessity, have to be quite small. In order to have enough flow area for adequate and efficient flow through the fluid filter, a relatively large number of these smaller holes is required. As the number of holes increases, the spacing between holes decreases and this would significantly weaken the nutplate. Consequently, a modified design needs to be provided for the nutplate and for the cooperating filter seals in order to provide for the necessary flow of unfiltered fluid into the fluid filter assembly. These modified designs are provided by the present invention in a novel and unobvious manner. As will be described, there are four different inner seals disclosed in order to cooperate with the various nutplate embodiments of the present invention.

The nutplate designs of the present invention are disclosed in various arrangements and for each one there is a specifically styled inner seal. Each inner seal design is positioned over the end of the filtering element and around an exit flow conduit which is part of the engine block mounting base. One style of inner seal cooperates with one style of nutplate of the primary embodiment in order to create flow passageways therebetween through alternating open sections in the seal. In the other style of inner seal, the flow passageways which are defined between the nutplate and the inner seal are created by the use of depending projections from the lower wall of the nutplate. Otherwise, the two inner seals function in a similar fashion. In the related embodiment of the fluid filter, one style of inner seal cooperates with the mounting base and radial flow areas are created between the nutplate and the filter element. The other style of inner seal for this related embodiment includes its own flow passageways as well as cooperating with the nutplate for the creation of radial flow areas.

The outer seal provides a sealed interface between the mounting base and the outer shell which is formed over the upper annular portion of the nutplate, outward of the location of the threaded connection. The outer seal is uniquely styled with a pair of circumferential ribs for sealing redundancy. The outer seal also helps to dampen vibrations which may be transmitted by the mounting base. The cooperation of the inner and outer seals with the nutplate styles of the present invention provides an improved fluid filter assembly.

SUMMARY OF THE INVENTION

A seal arrangement for a fluid filter assembly which is constructed and arranged to threadedly mount onto an engine block mounting base according to one embodiment of the present invention comprises an inner seal and an outer seal. The fluid filter assembly includes an outer shell, a filtering element located within the outer shell and defining therewith an annular clearance space and a nutplate which is anchored to the outer shell and which provides a threaded interface for assembly to the engine block mounting base. The inner seal is positioned between the nutplate and the filtering element. The outer seal is positioned between the engine block mounting base and the nutplate. Further, the outer seal includes a pair of spaced-apart ribs which provides a sealing interface against the engine block mounting base. The inner seal cooperates with the nutplate to provide a plurality of flow paths between the inner seal and the nutplate between the engine block mounting base and the annular clearance space.

One object of the present invention is to provide an improved seal arrangement for a fluid filter assembly.

Related objects and advantages of the present invention will be apparent from the following description.

DESCRIPTION OF THE PREFERRED EMBODIMENT

Figure 1:
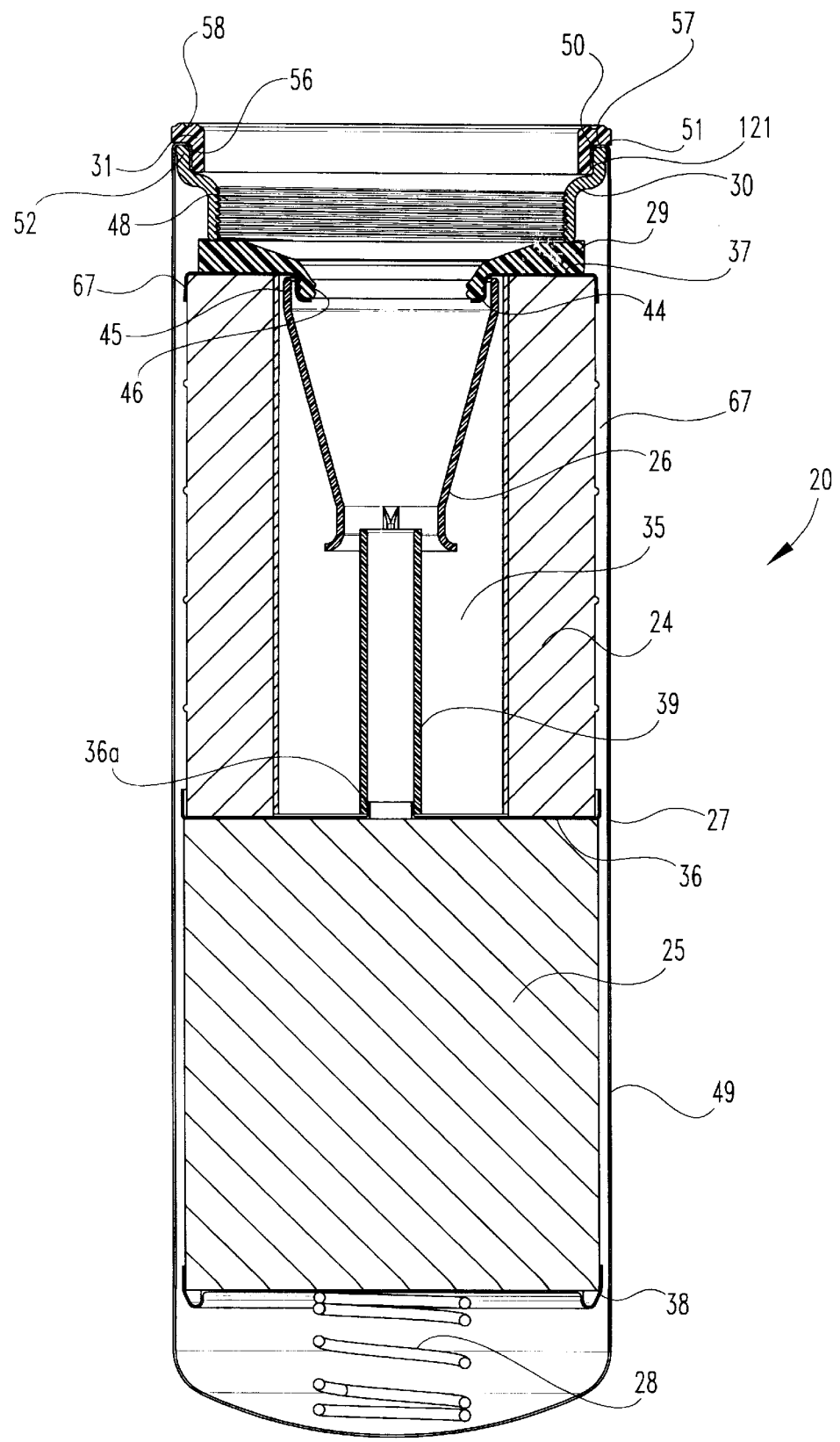
FIG. 1 is a front elevational view in full section of a fluid filter assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
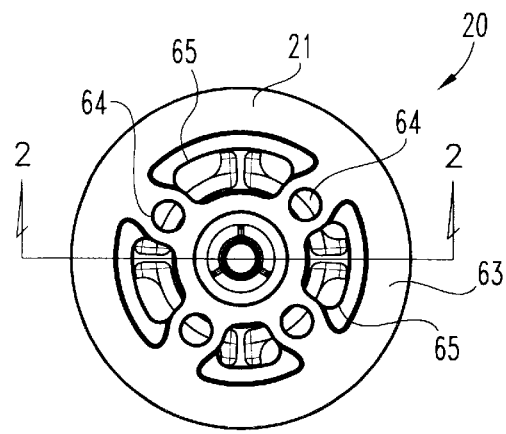
FIG. 3 is a top plan view of the FIG. 2 engine block mounting base with the FIG. 1 fluid filter assembly attached.
Figure 2:
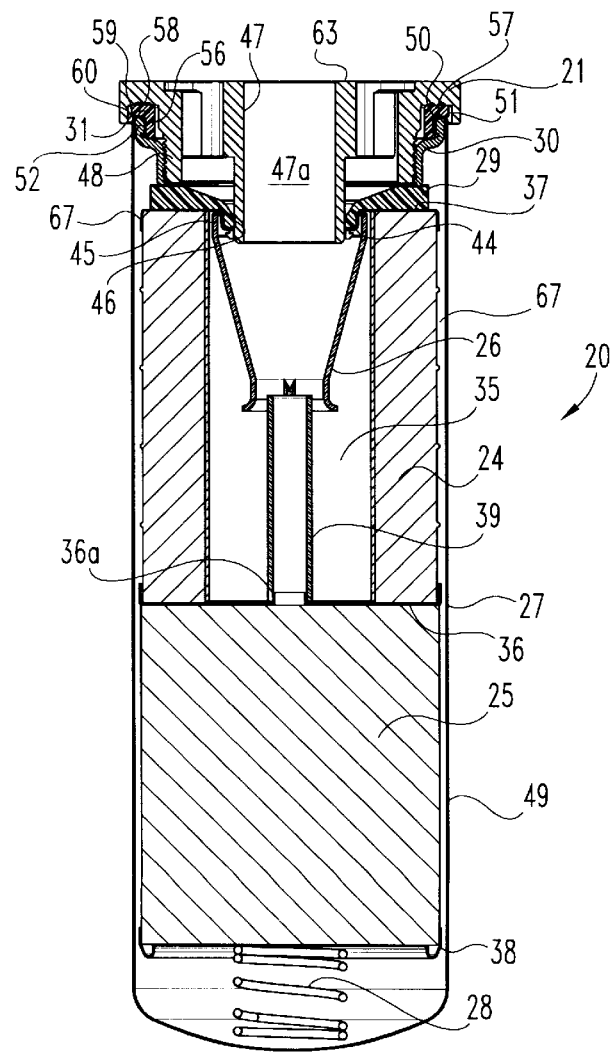
FIG. 2 is a front elevational view in full section of the FIG. 1 fluid filter assembly as mounted on an engine block mounting base according to the present invention.

Referring to FIGS. 1, 2, and 3, a fluid filter assembly 20 which is constructed and arranged according to the present invention is illustrated. In FIG. 1 the filter assembly 20 is illustrated as it would appear unmounted onto the filter head 21 (engine block mounting base) of FIG. 2. In the FIG. 2 illustration, the filter assembly 20 is threadedly attached and mounted onto filter head 21. FIG. 3 is a top plan (end) view of the filter head 21 with the filter assembly 20 attached.

Filter assembly 20 includes a full-flow, primary filter element 24, a cooperating by-pass filter element 25, an outlet flow nozzle 26, an outer shell 27, a support spring 28, an inner seal 29, a unitary nutplate 30, and an outer seal 31. The primary filter element 24 includes a hollow interior 35, a lower endplate 36, and an upper endplate 37. The two endplates are sealed across their corresponding primary filter element ends in order to prevent fluid flow out through the ends of the primary filter element 24. The by-pass filter element 25 abuts up against the lower endplate 36 and includes an enclosing base endplate 38. The interior of endplate 36 is open and formed with short, cylindrical conduit 36a. Tube 39 which fits around conduit 36a provides fluid flow communication from by-pass filter element 25 into nozzle 26. In the preferred embodiment, tube 39 is in unitary combination with flow nozzle 26, (i.e., a one-piece combination). The unitary tube 39 and flow nozzle 26 is constructed out of nylon. It is also envisioned that a separate tube 39 can be used and fitted around conduit 36a and located within nozzle 26.

Upper endplate 37 is formed with an inner annular lip 44 which provides an anchoring edge for inner seal 29. Inner seal 29 is fabricated out of rubber. The outwardly flared end 45 of flow nozzle 26 fits around the inner annular lip 44. The inside annular surface 46 of inner seal 29 fits up against stem 47 of the filter head 21 (see FIG. 2). The unitary nutplate 30, which may be stamped, molded, or machined, is internally threaded and is assembled to the externally-threaded portion 48 of filter head 21. In the preferred embodiment nutplate 30 is stamped out of metal.

The outer shell 27 is metal and has a substantially cylindrical sidewall 49 which includes a formed upper lip 50 which is shaped with an inverted receiving channel 51. Tightly and securely anchored into annular channel 51 is the annular upper, outer lip 52 of nutplate 30. While it would be desirable for this interface junction to be liquid-tight by the mechanical fit of the components, this is not achievable. Accordingly the outer seal 31 is provided to ensure that there is no leakage through this interface. Outer seal 31 is fabricated out of rubber. While an adhesive may be placed between the annular channel 51 and lip 52 of nutplate 30, this is done to help keep the nutplate from spinning during installation. Outer seal 31 provides an additional level of security against fluid leakage. Annular seal 31 fits down inside of the inner wall 56 of channel 51 and extends upwardly and outwardly over upper wall 57 of channel 51. The upper surface 58 of seal 31 abuts up tightly against the base 59 of channel 60 of filter head 21.

The end face 63 of filter head 21 includes an alternating pattern of four bolt holes 64 and four fluid inlet apertures 65. The fluid inlet apertures 65 provide fluid inlets for the fluid to be filtered to flow into the filter head 21. The four bolt holes 64 provide a means of mounting the filter head 21 to the vehicle engine. The open interior of head 21 provides a flow path into the vicinity of inner seal 29 where the unfiltered fluid is able to flow in a radially outward direction beneath the lower edge of nutplate 30. Stem 47 is hollow and is substantially coaxial with nozzle 26. The hollow interior 47a creates a flow exit passageway for the filtered fluid exiting from the primary filter element 24 and from the by-pass filtering element 25.

Figure 6:
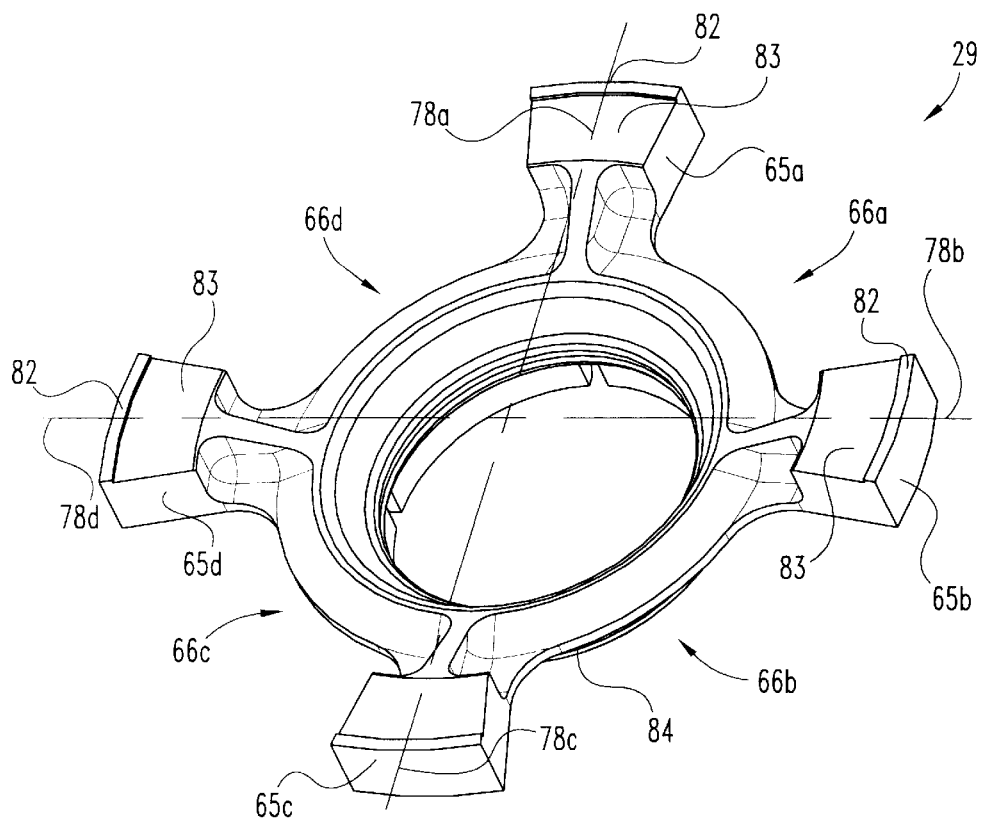
FIG. 6 is a perspective view of an inner seal which comprises one portion of the FIG. 1 fluid filter assembly.
Figure 7:
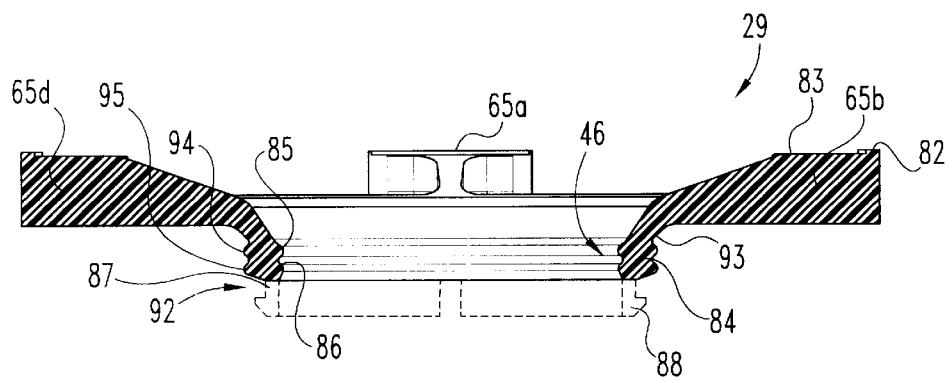
FIG. 7 is a front elevational view in full section of the FIG. 6 inner seal.

As will be understood by reference to FIGS. 2, 6, and 7, the inner seal 29 is configured with four flanges 65a–65d and in alternating sequence therewith, four flow openings 66a–66d. Depending on the threaded depth of the filter head 21 as it is axially advanced into the nutplate 30, either the lower edge of the filter head (portion 48) or the lower edge of nutplate 30 may come to rest on the top surface of seal 29. Once either the filter head or nutplate (or conceivably both) comes to rest on the top surface of the seal, four fluid flow passages are created past the inner seal via the four flow openings 66a–66d. These flow passages lead to outer annular clearance space 67 and from this space the fluid flows into the primary filter element 24 and as appropriate, into the by-pass filter element 25. Clearance space 67 is created and defined by the cylindrical shape of the outer shell 27, and by the cylindrical shape of filtering elements 24 and 25.

Figure 4:
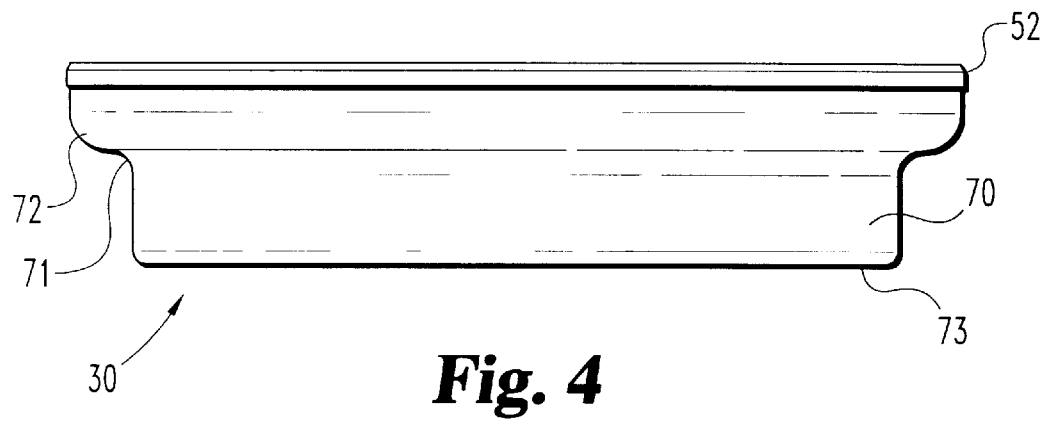
FIG. 4 is a front elevational view of a unitary nutplate according to a typical embodiment of the present invention.
Figure 5:
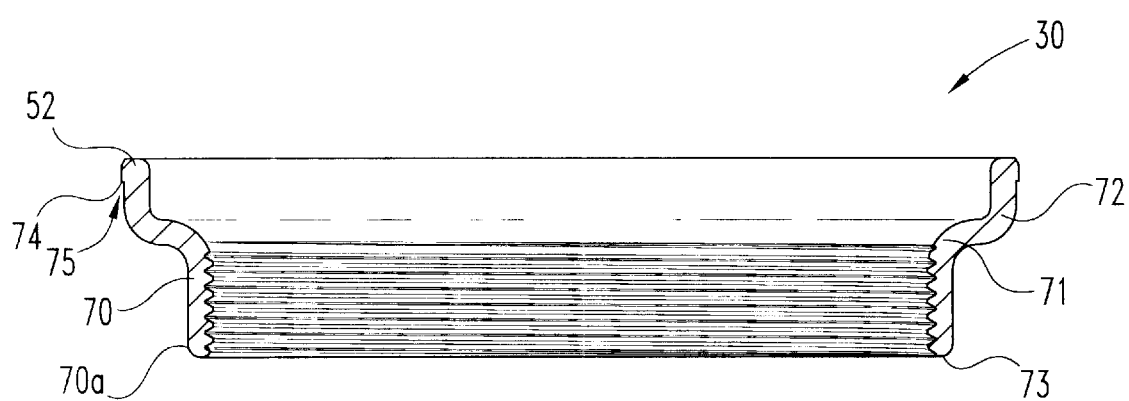
FIG. 5 is a front elevational view in full section of the FIG. 4 nutplate.

Referring now to FIGS. 4 and 5, the nutplate 30 is illustrated in greater detail. Nutplate 30 is an annular member with an internally-threaded lower wall portion 70, two radiused bends 71 and 72, and an annular outer lip 52. As previously described, the lower edge 73 which is a continuous cylinder in shape seals against the top surface of the inner seal 29. The outer lip 52 is securely received within the inverted receiving channel 51 of the outer shell. The slight undercut edge 74 on lip 52 is able to be used to crimp the outer shell 27 into recess 75 beneath edge 74 for a tighter and more secure joint between the outer shell 27 and the nutplate 30. In contrast to the typical designs for molded nutplates, internally-threaded portion 70 is substantially larger than earlier designs such that the radial distance between the inside diameter surface 70a of cylindrical wall 70 and the outside diameter of outer lip 52 is relatively short, thereby significantly reducing the length of the moment arm. In one embodiment of the present invention, the inside diameter size of portion 70 is approximately 3.52 inches and the outside diameter size of lip 52 is approximately 4.43 inches for a moment arm of approximately 0.455 inches. With the moment arm reduced to a significantly shorter length, the amplitude of the vibrations seen by the filter assembly 20 is reduced. Vibrations are generated by engine operation and are transmitted to the vehicle as the vehicle travels over the road. These vibrations are transmitted to the fluid filter assembly by the filter head 21 at the location of the threaded fit between nutplate portion 70 and the threaded portion 48 of filter head 21. The transmitted vibrations travel to the outer shell 27 and it is believed that the length of the moment arm is directly proportional to the amplitude of the vibrations as seen by the outer shell. By increasing the inside diameter size of portion 70 over that of the more "traditional" nutplates for approximately the same outer shell size, the moment arm is reduced which in turn reduces the amplitude of the vibrations which are transmitted to and seen by the outer shell.

With "traditional" nutplates, fluid inlet apertures are formed in that portion of the nutplate between the threaded inside diameter and the outer peripheral edge. Since the inside diameter of traditional nutplates is substantially smaller than the inside diameter of the present invention nutplate, there is sufficient area which is of an annular ring shape for fluid inlet apertures to be molded, cast, or machined directly into and through the nutplate. However, with the present nutplate design, the total width of the sidewall from the inside diameter 70a to the outside diameter of outer lip 52 is very narrow, typically less than ½ inch. The only land area for inlet flow holes to be formed is between radius bends 71 and 72. The narrow width of the land area means that any flow hole which would be drilled, cast, or molded through that area must be extremely small. In order to get adequate fluid flow, a large number of these smaller flow holes would be required. In order to get sufficient flow area, a great deal of nutplate material would have to be removed from this narrow land area and this would substantially weaken the nutplate. Accordingly, the nutplate of the present invention is free of any flow inlet holes which are actually formed into and through any portion of the nutplate 30. Instead, the present invention incorporates a unique style of nutplate in combination with a cooperating inner seal in order to create a plurality of flow paths for the incoming unfiltered fluid which actually passes between the nutplate and the corresponding inner seal as it flows from the engine block mounting base into the annular clearance space 67.

Filter head 21 includes threaded portion 48 which provides the mounting or attachment structure for the fluid filter assembly 20. With the filter head 21 properly mounted to the engine and with the flow passages and conduits connected, the filter assembly 20 can be readily and easily installed by threading the nutplate 30 onto portion 48. As this threaded engagement is advanced and tightened, the outer annular seal 31 is drawn into sealing contact against the upper wall 57 and the inner wall 56 of channel 51.

Referring now to FIGS. 6 and 7, the unitary inner seal 29 is illustrated in greater detail. Each of the four flanges 65a–65d are virtually identical and are configured so as to be symmetrical about a corresponding and radiating centerline. Centerlines 78a–78d are located 90 degrees apart. Equally-spaced between adjacent flanges 65a–65d are flow openings 66a–66d. Fluid flow entering filter head 21 is initially received between stem 47 and threaded portion 48. In order to travel into annular clearance space 67, the fluid must travel radially outwardly beneath the lower edge 73 of nutplate 30. The only places where such fluid flow can occur is at the locations of the four flow openings 66a–66d.

Each flange 65a–65d includes a radiused outer lip 82 and a land area 83. The lower edge 73 of nutplate 30 rests inside of the four lips 82 and on top of the four land areas 83. The center hub 84 is a hollow, annular structure which includes inside annular surface 46 with two spaced-apart annular ribs 85 and 86. These two ribs tightly abut up against stem 47 in order to provide a sealed interface. The outer surface 93 of center portion 84 includes two spaced-apart sealing ribs 94 and 95 which fit tightly up against the annular lip 44 of upper endplate 37. Each flange 65a–65d is illustrated with an optional depending wall 87 which includes an offset portion 88. Since the preferred embodiment of each flange does not include the depending wall nor the offset portion, these are illustrated in broken line form. If present as an alternative embodiment, the tapered and offset portion 88 is constructed and arranged to fit beneath inner annular lip 44. In this alternative embodiment, using the optional wall 87, the innermost edge of lip 44 fits within recess channel 92.

The inner seal 29 is designed to provide dual radial seals on the upstream side of the fluid flow as well as on the downstream side. The two ribs 85 and 86 on the inside surface 46 of center portion 84 abut up against stem 47 to prevent the incoming fluid flow from by-passing the filter elements by passing directly into flow nozzle 26. On the downstream side the filtered fluid in nozzle 26 is precluded from flowing past center portion 84, on either the inside diameter side or on the outside diameter side due to the presence of ribs 85 and 86 and ribs 94 and 95, respectively.

In contrast to earlier seal designs which provide sealing by means of a compression face seal, the present invention incorporates dual radial seals. The inner seal 29 also functions as a vibration damper between the nutplate 30 and the upper endplate 37 to limit the level of vibration which is transmitted to the primary filter element 24. During the installation of the filter assembly 20 onto filter head 21, the positioning of stem 47 into center portion 84 provides some degree of coarse alignment between the filter assembly 20 and the filter head 21, such that the threaded engagement can be achieved more easily, especially in blind installations.

Figure 8:
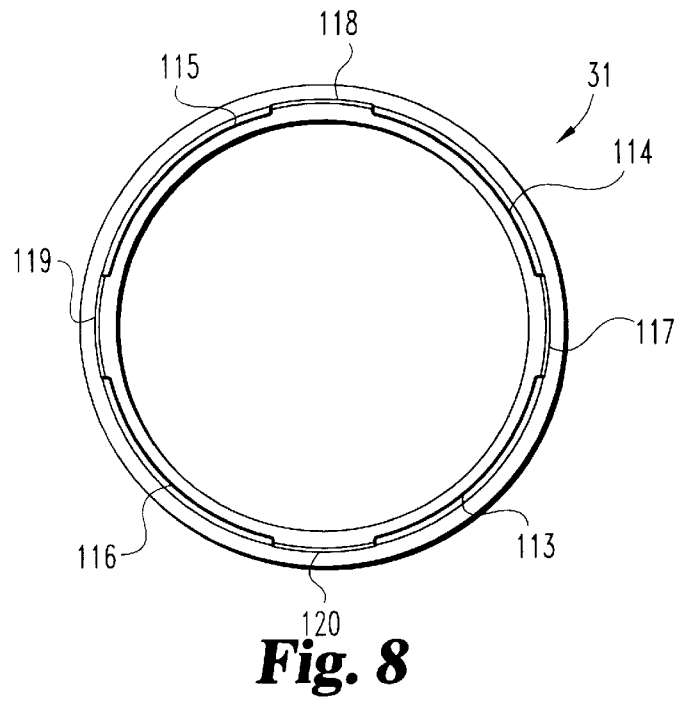
FIG. 8 is a bottom plan view of an outer seal which comprises one portion of the FIG. 1 filter assembly.
Figure 9:
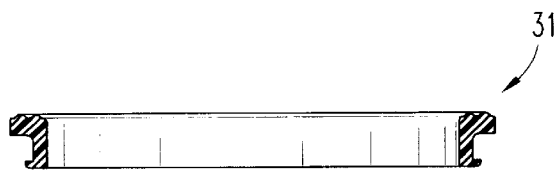
FIG. 9 is a front elevational view in full section of the FIG. 8 outer seal.
Figure 10:
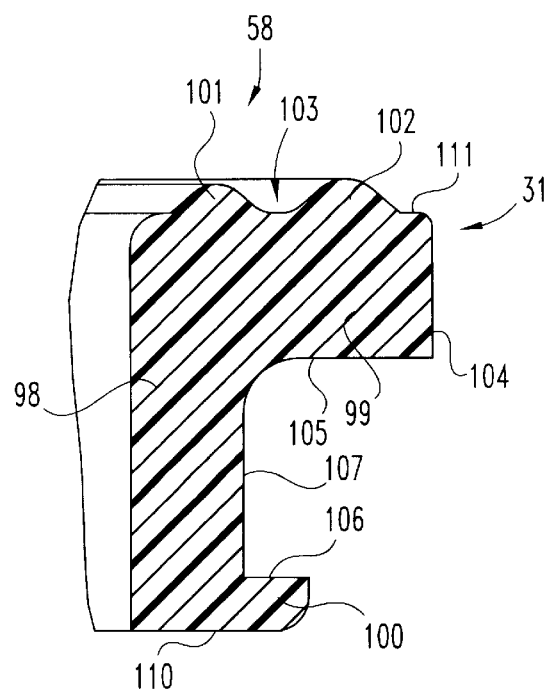
FIG. 10 is an enlarged, partial, front elevational view of the sidewall of the FIG. 8 outer seal.

Referring now to FIGS. 8, 9, and 10, the outer seal 31 is illustrated in greater detail. Outer seal 31 is a substantially annular member with a substantially cylindrical sidewall portion 98 which is bounded on the top by upper surface 58 and radial flange 99 and on the bottom by radial lip 100. Upper surface 58 includes two raised annular ribs 101 and 102 which are radially spaced apart from each other by an annular recessed portion 103. Portion 103 is curved in lateral section as is illustrated in FIG. 10. The outer surface 104 of flange 99 is substantially cylindrical and underside surface 105 is substantially planar. The cylindrical axis of surface 104 is substantially perpendicular to surface 105. The upper annular surface 106 of lip 100 is substantially planar and substantially parallel to surface 105. The outer cylindrical surface 107 of sidewall portion 98 is substantially concentric with respect to surface 104.

The lower surface 110 has an annular ring shape and is substantially planar. The geometric planes which generally define and are coextensive with surfaces 110, 106, and 105 are each substantially parallel to the others. Surfaces 105 and 107 fit tightly up against upper wall 57 and inner wall 56, respectively, of the inverted receiving channel 51. The abutment of these two surfaces to the two cooperating walls establishes a fluid-tight interface between outer seal 31 and the formed upper lip 50 of outer shell 27 which defines channel 51.

While it has been described that the upper surface 58 abuts up tightly against base 59 of channel 60, it is actually ribs 101 and 102 which contact base 59. Rib 101 extends above surface 111 by approximately 0.033 inches and rib 102 extends above surface 11 by approximately 0.039 inches. The slight height difference between these two ribs is designed into the upper seal in order to provide enhanced sealing and to create sealing redundancy. Seal 31 provides a means of preventing any fluid leakage from the filter assembly 20 between the filter assembly and the filter head 21. Additionally, seal 31 provides a damper against vibration. While most outer seals of earlier fluid filter assemblies provide a single seal by means of a compression face seal, the present invention, by way of seal 31, uses the two ribs in compression. The built in redundancy of the two ribs offers first and second lines of defense to prevent filter assembly leakage. If there is a deterioration of the seal through one of the ribs such that the seal opens, the second rib provides a backup seal to prevent leakage. By using the two ribs 101 and 102, any slight dimensional variations or misalignments will not preclude the establishment of a sealed interface. As the two ribs are gradually compressed, the resistance force of seal 31 against further compression also increases rapidly. This gives a positive feedback in feel to the installer so that the installer can tell where to stop without overtightening (i.e., threading) the filter assembly 20 into the filter head 21. In order to maintain the flexibility and resiliency of seal 31, it is important that is not be compressed to the point that the seal becomes functionally "solid".

By creating seal 31 such that rib 102 is "higher" than rib 101 by approximately 0.006 inch, seal 31 will not move from its position nor tip over during installation. Further, the protruding tips of each ribs 101 and 102 have less total surface area, even when compressed, than earlier conventional face seal designs. This reduced surface area reduces the installation and removal friction and torque, making the filter assembly easier for the customer to use. Radial lip 100 and surface 106 are constructed and arranged to catch onto the lower edge of the inner wall 56 of channel 51.

While radial lip 100 is substantially annular in shape, it is configured in a split ring fashion as is illustrated in FIG. 8. Lip 100 includes four circumferential sections 113, 114, 115, and 116. Each pair of adjacent sections are spaced apart by spaces 117, 118, 119, and 120. As described, lip 100 is used to snap beneath the inner, lower edge 121 of inner wall 56 and thereby anchor the outer seal 31 to the remainder of filter assembly 20. In this way, the seal 31 comes off with the filter assembly 20 when the filter assembly 20 is removed from the filter head 21, rather than staying on the filter head 21. The split-finger design of radial lip 100 (i.e., the four spaced-apart sections 113–116) enables an easy snap-fit assembly of the outer seal 31 and permits a simplified molding process.

Figure 11:
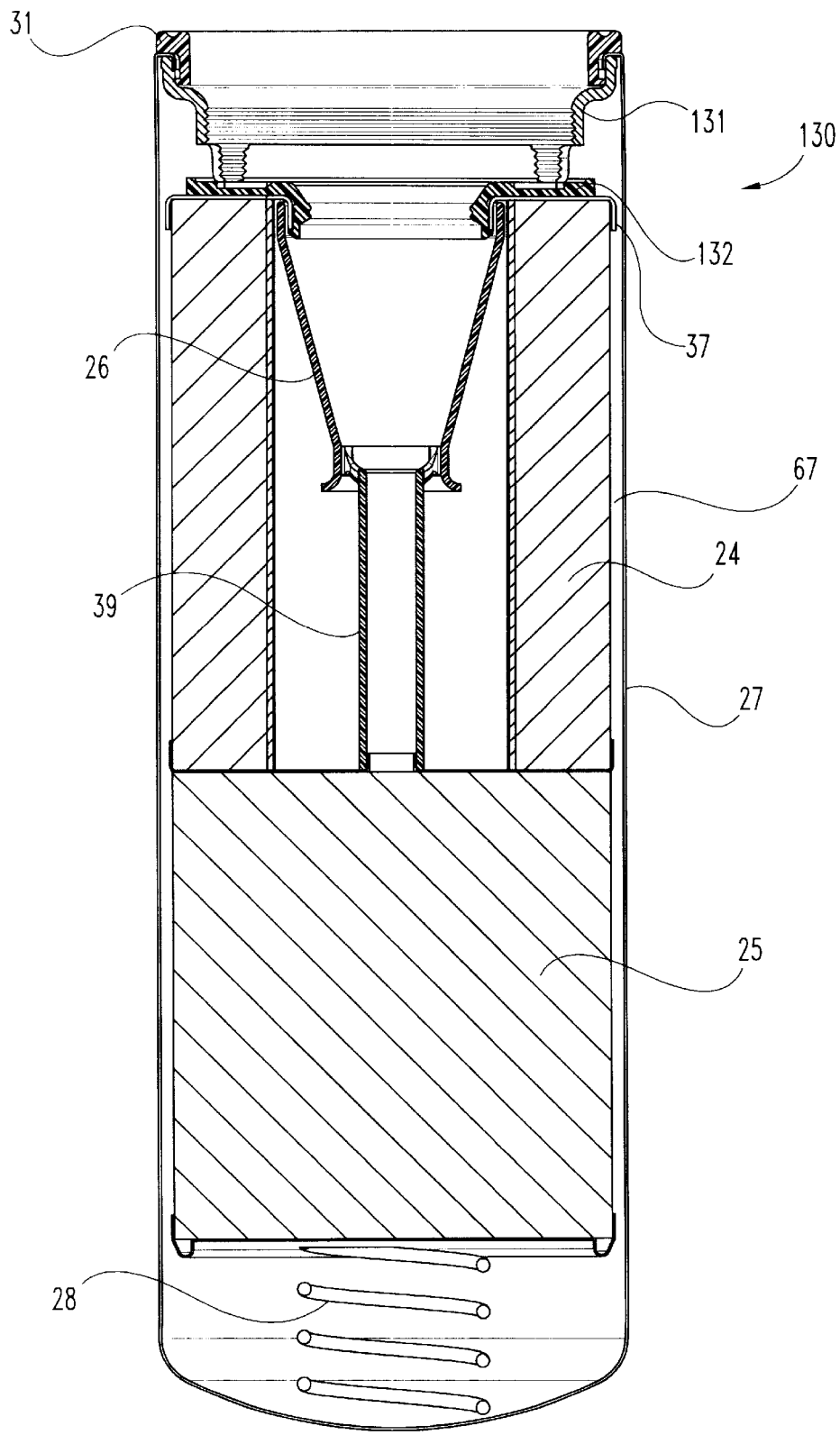
FIG. 11 is a front elevational view in full section of an alternative fluid filter assembly according to another embodiment of the present invention.
Figure 13:
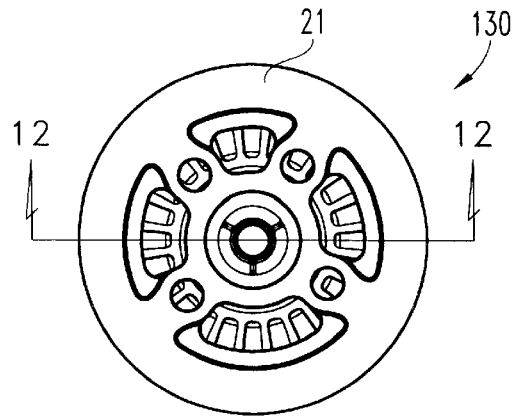
FIG. 13 is a top plan view of the FIG. 12 engine block mounting base with the FIG. 11 fluid filter assembly attached.
Figure 12:
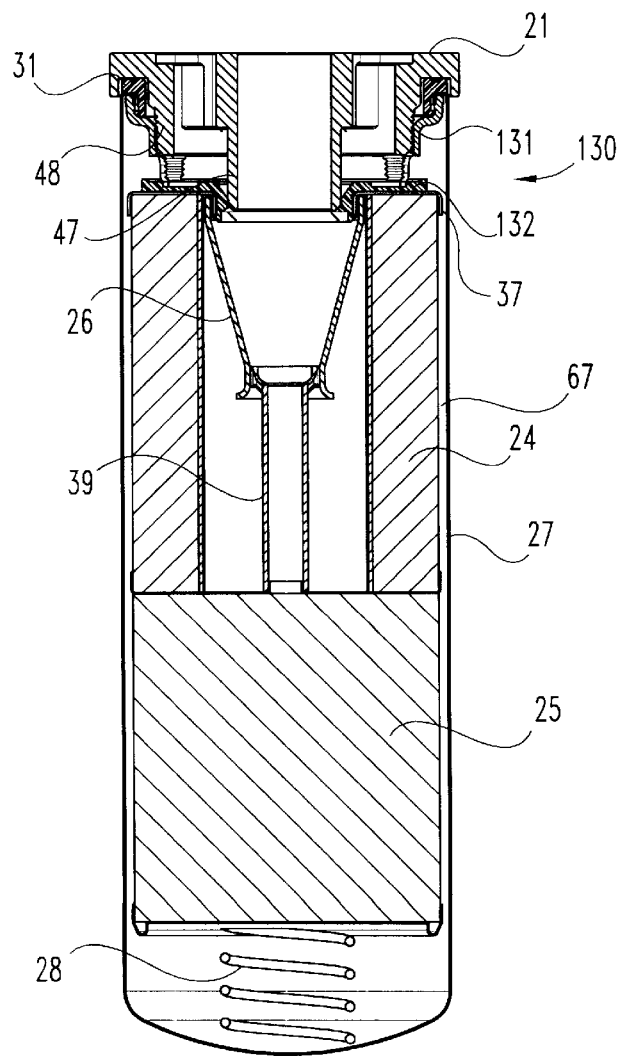
FIG. 12 is a front elevational view in full section of the FIG. 11 fluid filter assembly as assembled onto an engine block mounting base.

Referring now to FIGS. 11, 12, and 13, an alternative filter assembly 130 according to the present invention is illustrated. Fluid filter assembly 130 is virtually identical to fluid filter assembly 20 with two exceptions. Fluid filter 130, as compared to fluid filter assembly 20, includes a differently styled nutplate 131 (see FIGS. 14 and 15) and a differently styled inner seal 132 (see FIGS. 16 and 17). The filter head 21 of FIGS. 12 and 13 is the same as that used in the filter assembly and filter head combination of FIGS. 2 and 3. The remainder of filter assembly 130 is the same as filter assembly 20 and the outer seal 31 of FIGS. 11 and 12 is identical to the outer seal 31 of FIGS. 1 and 2.

Figure 14:
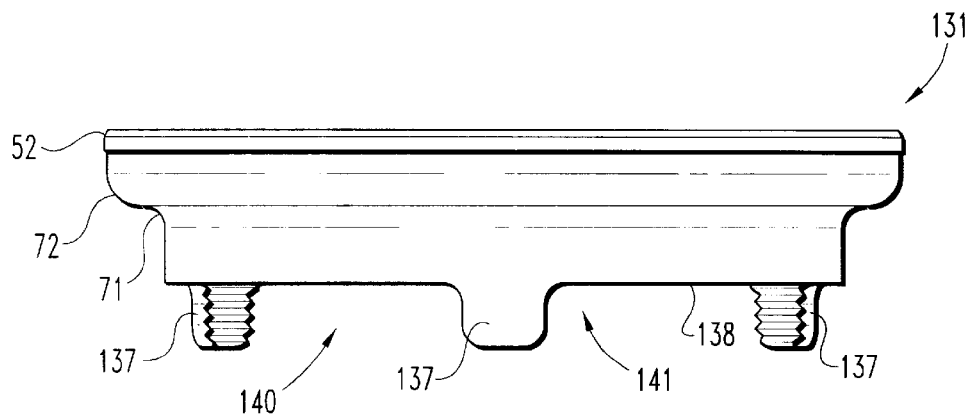
FIG. 14 is a front elevational view of a nutplate which comprises one portion of the FIG. 11 fluid filter assembly.
Figure 15:
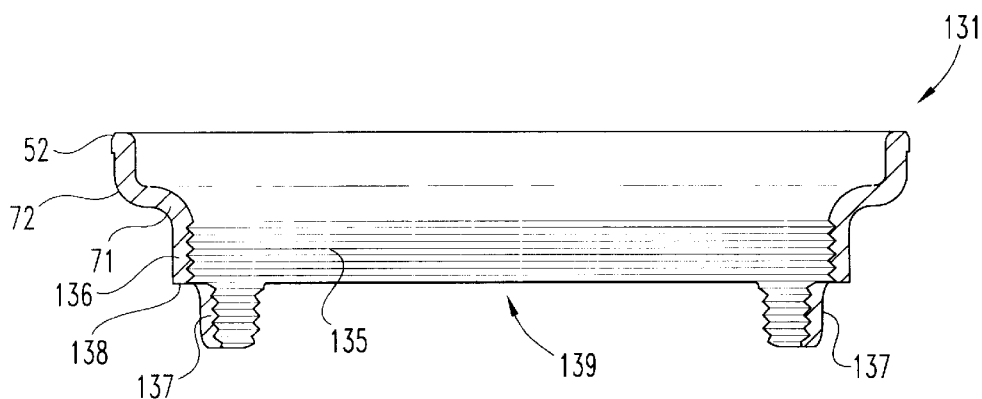
FIG. 15 is a front elevational view in full section of the FIG. 14 nutplate.

With regard to the only two differences between filter assembly 130 and filter assembly 20, refer to FIGS. 14–17. In FIGS. 14 and 15, annular nutplate 131 is illustrated in greater detail. Nutplate 131 is the same as nutplate 30 from bend 71 to outer lip 52. Below bend 71 the two nutplate designs are different. While nutplate 30 has an internally-threaded portion 48 which is substantially cylindrical, the internally-threaded portion 135 of nutplate 131 is configured with a smaller cylindrical section 136 and three depending projections 137. The three projections 137 are equally spaced around the circumference of section 136 and extend downwardly from lower edge 138. A consequence of this design is the creation of three flow openings 139, 140, and 141. In order to help visualize the nature of the three flow openings 139–141, imagine a horizontal line drawn in FIGS. 14 and 15 which touches the lower edge of each projection 137. This horizontal line creates three openings, each of which is defined on its boundary side by lower edge 138, on its sides by one pair of adjacent projections 137, and on its lower boundary by the imaginary horizontal line. In the actual design of the present invention, the imaginary horizontal line is in fact replaced by the upper or top surface of inner seal 132. The combination of nutplate 131 and inner seal 132 creates and defines the three flow openings 139–141 between these two members and through which unfiltered fluid passes on its way from the engine block mounting base to the annular clearance space 67. In this arrangement the entering flow is past the nutplate 131 and across the surface of the inner seal 132. In the FIG. 1 arrangement the entering flow is beneath (i.e., across) the nutplate lower edge 73 and past adjacent flanges 65a–65d. The nutplate 131 is constructed and arranged such that the lower surface of each projection rests on the upper surface of inner seal 132. The inside surface of each projection is internally threaded as a continuation of the thread pitch present as part of section 136. In this way, the threaded advancement of the filter assembly 130 by way of nutplate 131 onto filter head 21 does not have to stop at the lower edge 138.

Figure 16:
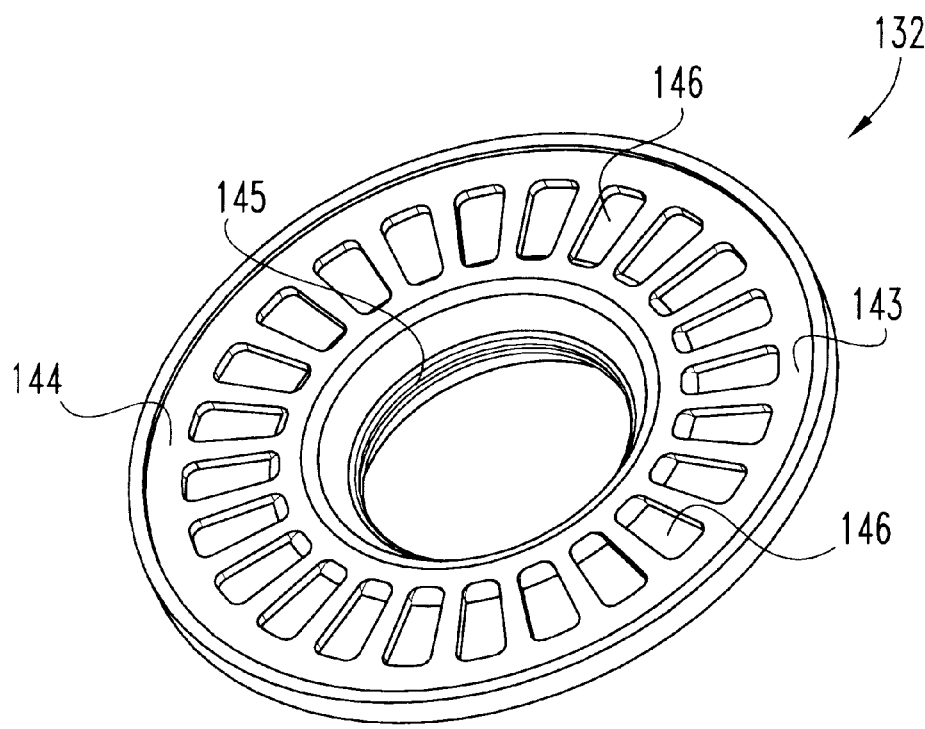
FIG. 16 is a perspective view of an inner seal which comprises one portion of the FIG. 11 fluid filter assembly.
Figure 17:
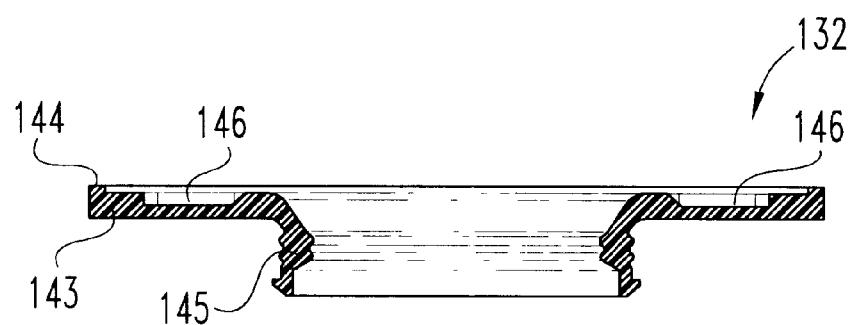
FIG. 17 is a front elevational view in full section of the FIG. 16 inner seal.

Referring now to FIGS. 16 and 17, the inner seal 132 is illustrated in greater detail. Seal 132 is virtually identical to inner seal 29 except that the four flanges 65a–65d are replaced by a continuous annular ring portion 143. Since the four openings 66a–66d are effectively "filled-in" by the design of seal 132, an alternative fluid flow path needs to be established. Since the fluid cannot flow through the inner seal 132, the fluid must flow across the upper surface 144 of seal 132. This is where the openings 139–141 are utilized. The fluid is able to flow beneath lower edge 138, through openings 139–141, and into clearance space 67. The center portion 145 and all of the corresponding and cooperating structural features are identical to center portion 84 and its corresponding and cooperating structural features. The circumferentially arranged series of equally-spaced pockets 146 which are formed in the upper or top surface 144 of seal 132 are provided for weight and material reduction. The nature of use for the inner seal 132 and its placement within the filter assembly permits a weight and material reduction without creating any negative effect, such as reducing the strength or rigidity of the part. A reduction in the amount of material helps to lower the cost of the fluid filter assembly. The placement of the inner seal 132 flat against the filter endplate 37 provides the necessary backing to the inner seal 132 and the sealing capabilities of the inner seal are not affected by the creation of the weight-reduction, material-reduction pockets 146.

A related embodiment of the present invention is illustrated in FIGS. 18–31. FIG. 18–24 illustrate one style of this related embodiment while FIGS. 25–31 illustrate a second style of this related embodiment. The focus of this related embodiment is on the installation procedure and the sequence of steps involving the threading of the fluid filter 160 onto the cooperating filter head 161 (see FIGS. 18–21). In the description which follows, references to upper and lower and top or bottom are based upon the orientation of the fluid filter 160 and filter head 161 as illustrated in FIGS. 18–21. However, it is to be understood that in actual vehicles the orientation of these two components could be different from that illustrated herein.

Figure 19:
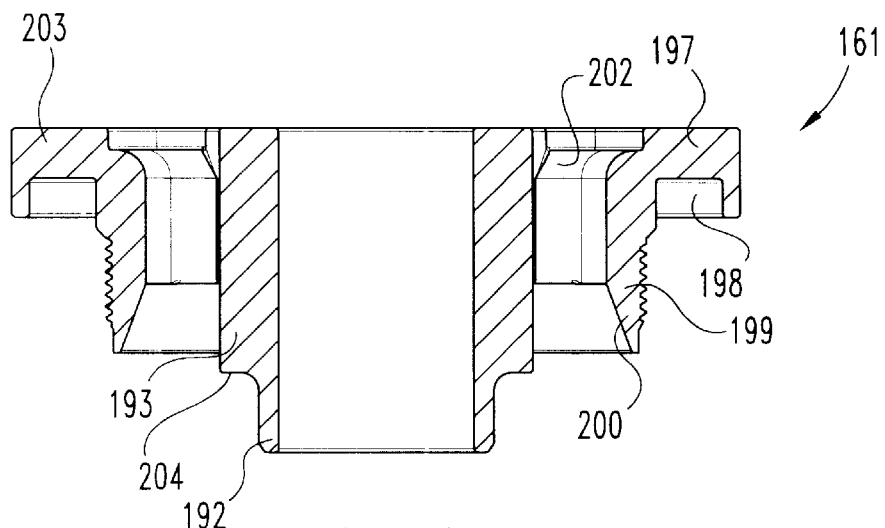
FIG. 19 is a front elevational view in full section of a filter head to which the FIG. 18 fluid filter is assembled according to the present invention.
Figure 18:
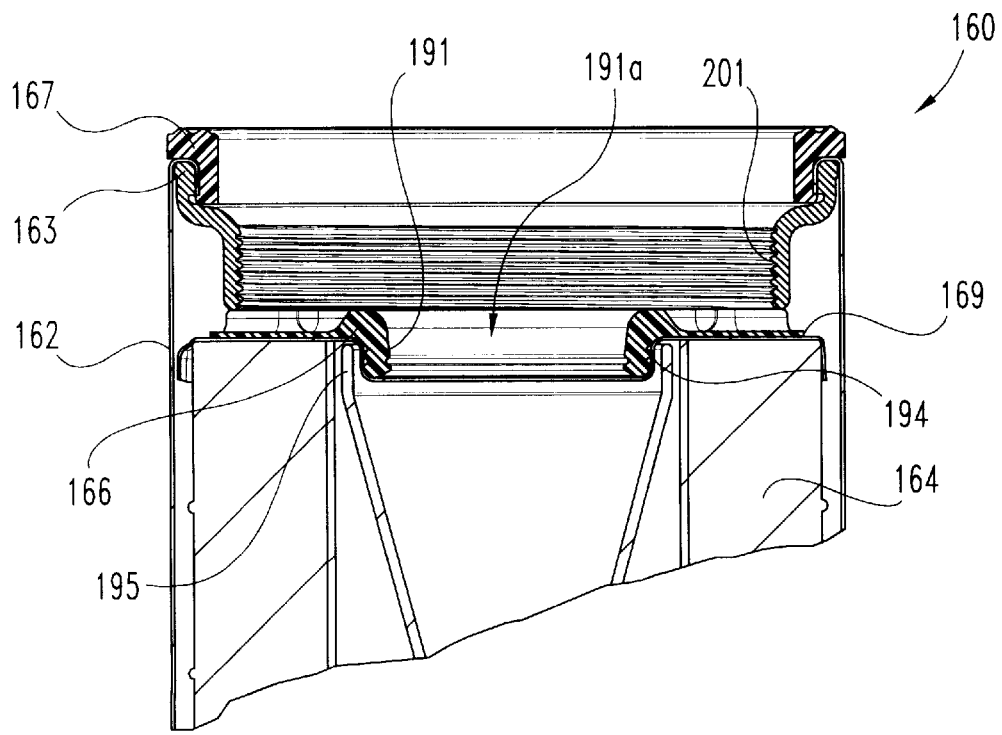
FIG. 18 is a partial front elevational view in full section of a fluid filter according to another embodiment of the present invention.
Figure 20:
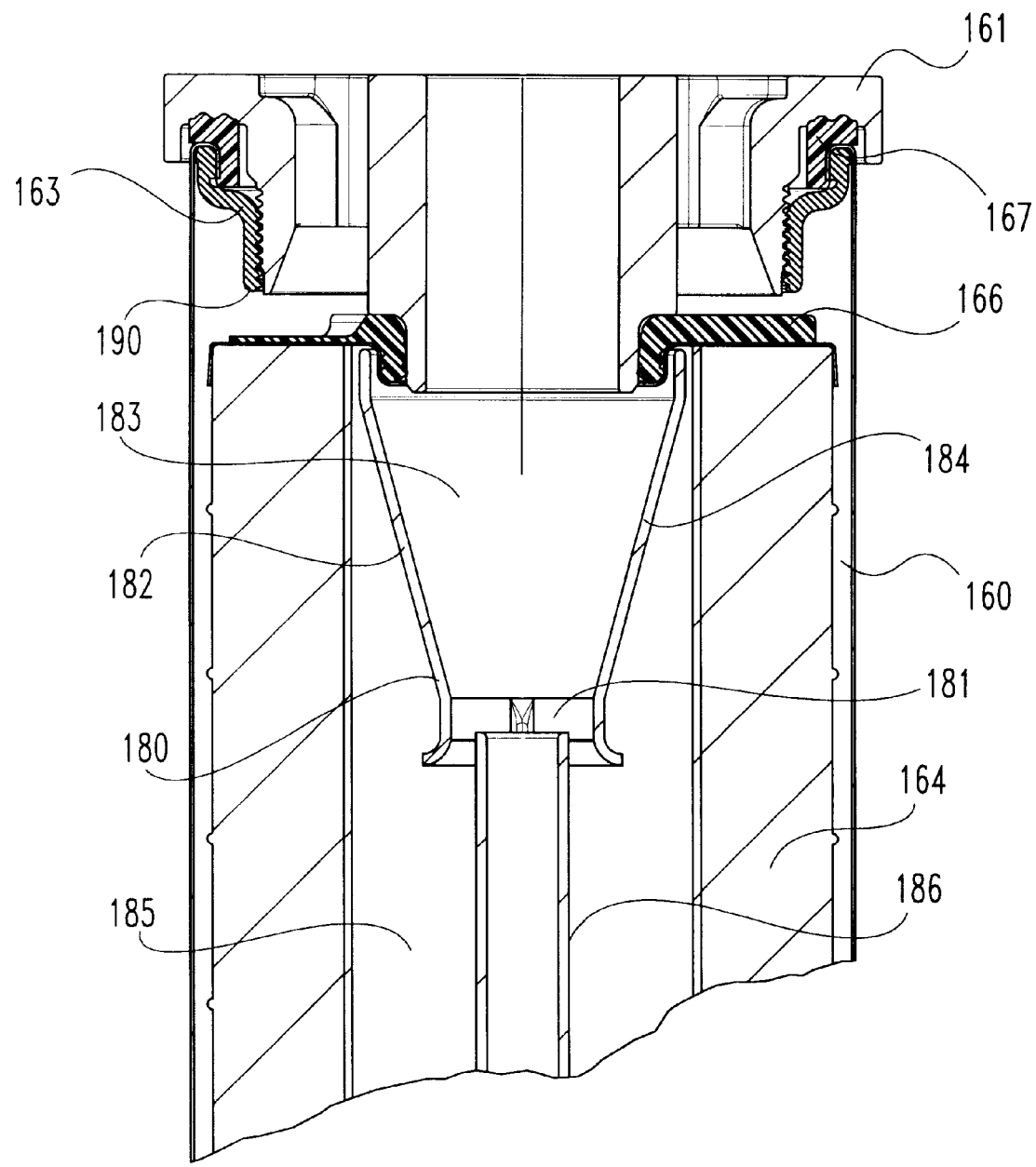
FIG. 20 is a partial, front elevational view in full section of the FIG. 18 fluid filter as assembled onto the FIG. 19 filter head according to the present invention.
Figure 21:
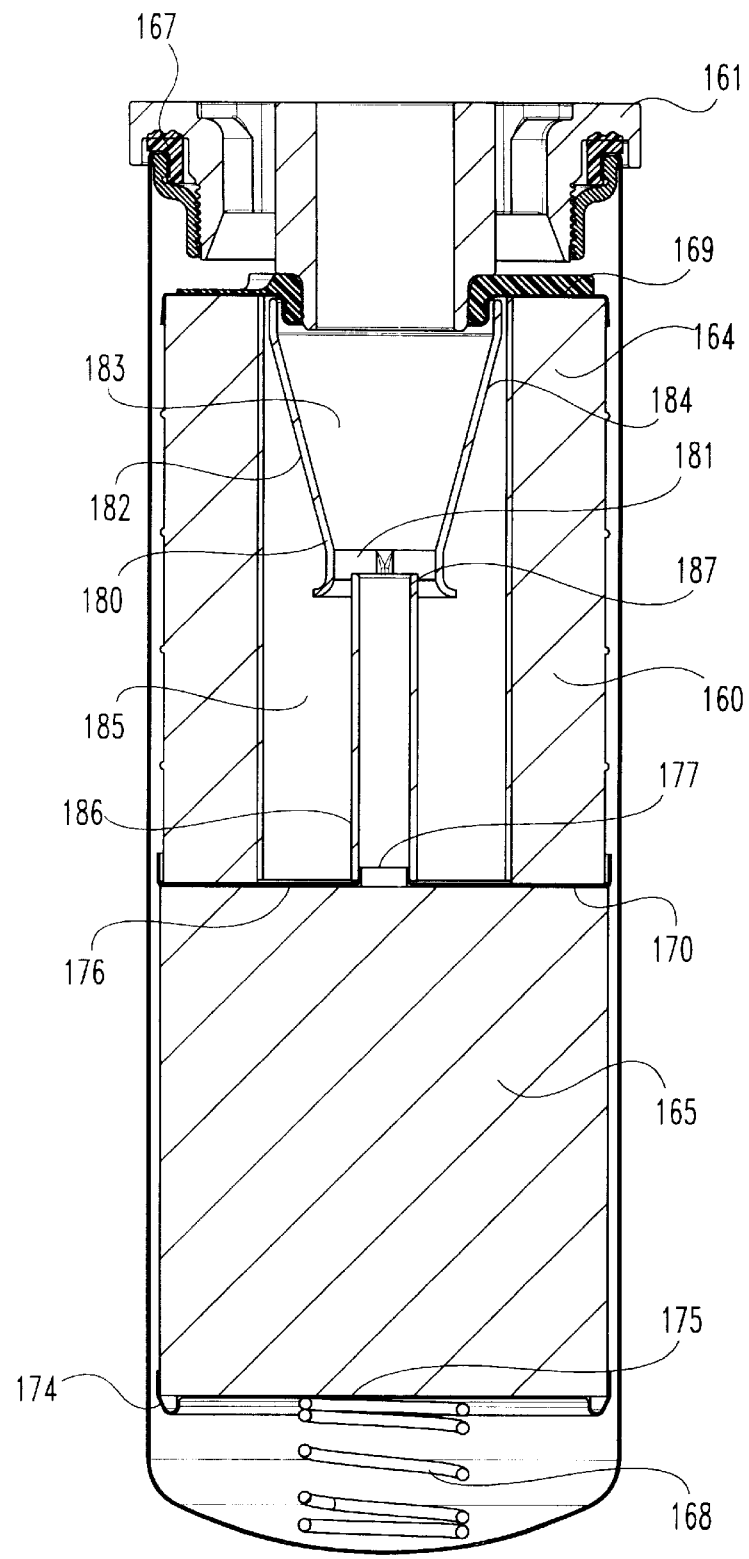
FIG. 21 is a front elevational view in full section of the FIG. 20 partial view.

Referring now to FIG. 18, the open end of a fluid filter 160 according to the present invention is illustrated. The remainder of fluid filter 160 is illustrated in FIG. 21. A cooperating filter head 161 is illustrated in FIG. 19. The assembly (i.e., installation) of fluid filter 160 and filter head 161 are illustrated in FIGS. 20 and 21.

Fluid filter 160 includes an outer housing 162, annular nutplate 163, a primary filtering element 164, a by-pass filtering element 165, an inner seal 166, an outer seal 167, and a support spring 168. The annular nutplate 163 is a unitary member which is internally threaded for threaded engagement and assembly to the externally threaded annular wall of the filter head. The primary filtering element 164 includes a hollow, generally cylindrical filtering media and top and bottom endplates, 169 and 170, respectively. The by-pass filtering element 165 includes a lower endplate 174 which seats against the upper end 175 of support spring 168. The opposite end of by-pass filtering element 165 is sealed up against the bottom endplate 170 and annular inner plate 176 closes off the remainder of the by-pass filtering element 165. All exiting fluid must pass through outlet conduit 177.

Venturi flow nozzle 180 is a unitary member which includes a low pressure zone 181 at the throat and a gradually diverging sidewall 182 which has a conical shape and defines a pressure-recovery zone 183 in the downstream divergent section 184. The flow nozzle 180 is effectively positioned entirely within the hollow interior 185 of the primary element. One end of tube 186 fits over conduit 177 in a liquid-tight manner and the opposite end 187 of the tube is positioned within the low pressure zone 181 and is substantially centered within the defining sidewall of the flow nozzle. In the preferred embodiment the tube 186 and flow nozzle 180 are combined as a unitary member.

Fluid filter assembly 20 and fluid filter 160 are virtually identical relative to the design and arrangement of the outer housing or shell, the two filtering elements, the venturi flow nozzle, and connecting tube, endplates, and the support spring. This portion of the present invention which is not the primary focus of the invention is also described in part in U.S. Ser. No. 08/699,713, filed Aug. 27, 1996, claiming priority to U.S. Ser. No. 08/084,875, filed Jun. 30, 1993. The pending Ser. No. 08/699,713 patent application is hereby expressly incorporated by reference for its disclosure of the flow mechanics and the cooperating structures associated with the two filtering elements.

The relationship of the outer shell 27 to the nutplate 30 and outer seal 31 as illustrated in FIG. 1 and described is the same for outer housing 162, nutplate 163, and outer seal 167 as illustrated in FIGS. 18, 20, and 21. Further, outer seal 31 and outer seal 167 are virtually identical to each other in size, shape, material, and function. The primary differences between the FIG. 1 fluid filter assembly 20 and the FIG. 21 fluid filter 160 involve the nutplates 30 and 163 and the inner seals 29 and 166. The FIG. 21 embodiment also establishes an important and unique assembly relationship between the fluid filter 160 and the filter head 161. This important and unique assembly relationship is utilized in order to improve the installation procedure of the fluid filter 160 onto the filter head 161 as well as to improve the procedure for removal of the fluid filter 160 from the filter head 161.

Inner seal 166 is positioned between the top endplate 169 and the lower edge 190 of the unitary nutplate 163. An inner lip portion 191 of the inner seal 166 extends inwardly in a radial direction and defines a substantially cylindrical passageway 191a for receipt of the protrusion 192 of the inner stem 193 of the filter head 161. The top endplate 169 includes an inwardly directed radial lip 194 which is positioned between the upper end 195 of the flow nozzle 180 and the inner lip portion 191. An innermost radial portion of radial lip 194 provides an abutment surface for lip portion 191. The foregoing description involving the inner seal 166, top endplate 169, and flow nozzle 180 is virtually identical to the assembly and relationships of the corresponding component parts of the FIG. 1 assembly.

Figure 24:
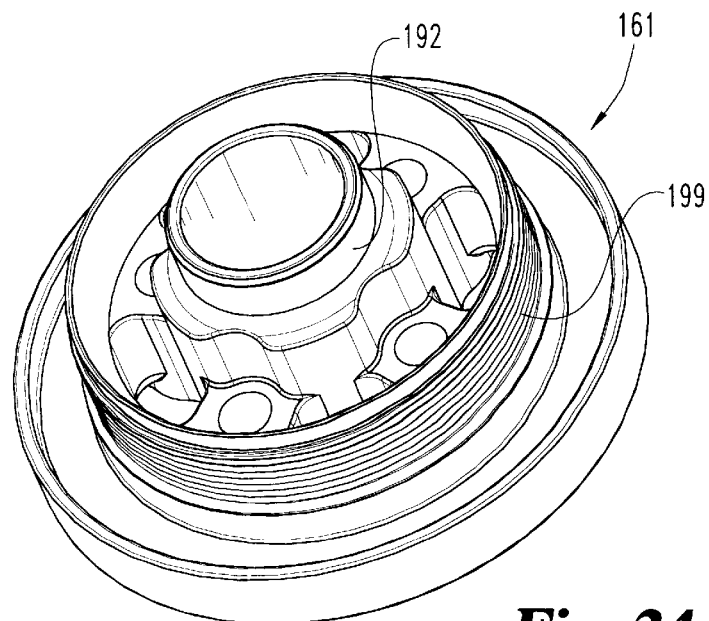
FIG. 24 is a perspective view of the underside of the FIG. 19 filter head according to the present invention.
Figure 26:
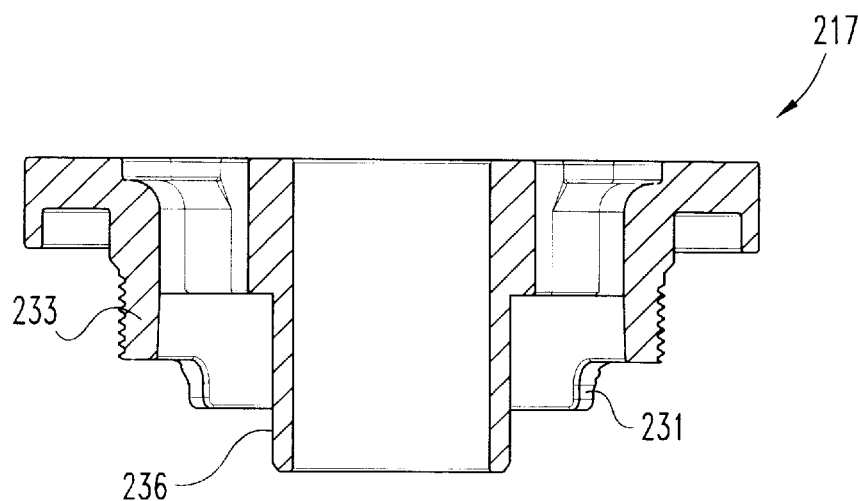
FIG. 26 is a front elevational view in full section of a filter head to which the FIG. 25 fluid filter is assembled according to the present invention.

With reference to FIG. 19, the structural details of the filter head 161 are illustrated. A perspective view of the underside of the filter head 161 is illustrated in FIG. 24. Filter head 161 includes an annular outer flange 197 which is constructed and arranged with an annular channel 198 (inverted) which is sized, shaped, and positioned to fit over and receive the outer seal 167 as well as a small portion of the outer housing 162 and nutplate 163 as is illustrated in FIGS. 20 and 21. The outer annular wall 199 is externally threaded around its lower edge 200 for threaded engagement with the internal threads 201 of the nutplate 163. The inner annular wall, (i.e., inner stem 193), is spaced apart from wall 199 and defines therewith an annular inlet flow corridor. Flow apertures 202 are provided in the upper wall 203 of the filter head 161 in order for the fluid which is to be filtered to enter the fluid filter 160.

Inner stem 193 includes a recessed, annular protrusion 192 which is substantially concentric with the remainder of stem 193 and extends from annular bearing surface 204 in the direction of the inner seal 166. As will be described in greater detail, the inner stem 193 is inserted into the passageway 191a defined by the inner lip portion 191 of the inner seal such that protrusion 192 establishes a liquid-tight interface against lip portion 191. Passageway 191a and protrusion 192 are each substantially cylindrical and are sized such that there is an interference fit causing the rubber compound used for inner seal 166 to be resiliently compressed in order to create the annular liquid-tight interface. Bearing surface 204 is located radially outwardly of the protrusion 192.

The axial positioning of the inner stem 193 is influenced by several portions of the fluid filter 160 and by various dimensional relationships involving these portions. The extent of threaded engagement between the outer annular wall 199 and the internal threads 201 of the nutplate is one factor. The abutment of bearing surface 204 against the upper surface of the inner lip portion 191 is another factor which influences the axial relationship between the filter head 161 and fluid filter 160. The axial length of support spring 168 relative to the axial length of the two filtering elements and the thickness of inner seal 166 are other factors. When the annular bearing surface 204 abuts against the top surface of lip portion 191, the fluid filter 160 is not fully seated and engaged into the filter head 161. The continued axial advancement of the filter head onto the fluid filter, (i.e., threaded engagement), causes the bearing surface 204 to push against the lip portion 191 and in turn the support spring is compressed. The spring constant also has an effect on the ease or difficulty in the continued threaded advancement. Another factor which is involved in the axial relationship between the filter head 161 and the fluid filter 160 is the engagement of the outer seal 167 into the inverted channel 198. The point at which these two portions abut, relative to when the bearing surface 204 abuts against the lip portion 191 relative to spring compression in the axial direction and relative to the thread engagement between the nutplate 163 and the filter head 161 all have an effect on the ease or difficulty of installing the fluid filter 160 onto the filter head 161 and the ease or difficulty in removing the fluid filter from the filter head.

Figure 22:
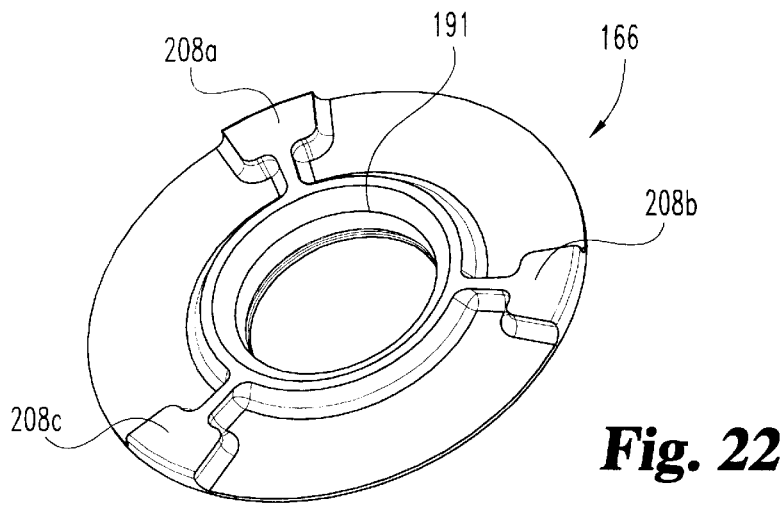
FIG. 22 is a perspective view of an inner seal comprising one portion of the FIG. 18 fluid filter.
Figure 23:
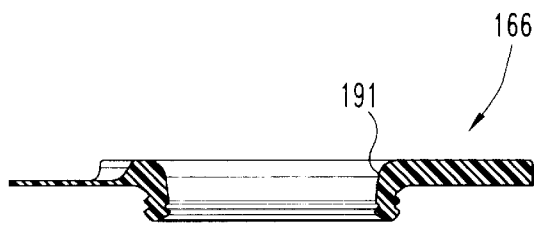
FIG. 23 is a front elevational view in full section of the FIG. 22 inner seal.

With reference to FIGS. 22 and 23, the inner seal 166 is illustrated in greater detail. Consistent with the objectives of the present invention, inner seal 166 includes annular inner lip portion 191 and three equally-spaced flanges 208a–208c which are in unitary, molded construction with lip portion 191. Before installation onto the filter head 162, the spring 168 pushes up on the filtering elements 164 and 165 causing the upper surface of each flange 208a–208c to abut up against the lower edge 190 of the nutplate 163. In this "before installation" condition, the flow passageways which are created between the inner seal and the nutplate and in between the three flanges 208a–208c provide a means of drainage. It is the open area between adjacent flanges which provides the open area for the flow passageways. The minimal clearances of these flow passageways, while adequate for drainage and venting, are not adequate to handle the full flow requirements during vehicle operation. When the fluid filter 160 is threaded onto the filter head 161 and bearing surface 204 pushes down on the lip portion 191, additional clearance is created between the inner seal and the lower edge of the nutplate, thereby establishing a radial flow area for the incoming fluid which is delivered by way of the filter head. This additional clearance is adequate to handle the full flow requirements. The inside edges of the lip portion 191 and the cylindrical opening defined by the inner lip portion are designed substantially the same as the corresponding portions of inner seal 29.

As generally described with regard to FIGS. 18–24, the assembly, (i.e., installation), sequence between the filter head 161 and the fluid filter 160 begins with thread alignment and then thread engagement. As the threaded engagement between the filter 161 and the nutplate 163 continues, the inner seal 166 is engaged, pushing down on the two filtering elements 164 and 165 and axially compressing the support spring 168. The support spring 168 acts as a thrust bearing and the downward axial movement of the primary filtering element opens up the radial flow areas. Next, with only the friction of the threads and the spring to resist turning, the outer seal is contacted by the inverted channel 198 of the filter head 161. This procedure allows for more accurate compression of the outer seal.

As will be understood, the ability of the present invention to function in the manner described is dependent on the design of the filter head and the dimensional relationship between the bearing surface 204, protrusion 192, the external threads on annular wall 199, the base of channel 198, and the location of the lip portion 199 before installation of the fluid filter 160 onto the filter head 161. When the fluid filter 160 is to be removed from the filter head 161, the installation sequence is followed in the reverse order of the sequence which has been described for installation.

With regard to FIGS. 25–31, a second arrangement of the related embodiment of the present invention is illustrated. The only difference between fluid filters 215 and 160 is limited to the differences between the two corresponding inner seals 216 and 166. There is also a difference between the filter heads 217 and 161 which is necessary in order to create a slightly different approach for the present invention. As for the remaining components, the outer seals, nutplates, filtering elements, outer housings, flow nozzles, and support springs are virtually identical for fluid filters 160 and 215 and accordingly, the same reference numerals have been used to denote that these components are virtually identical.

Figure 29:
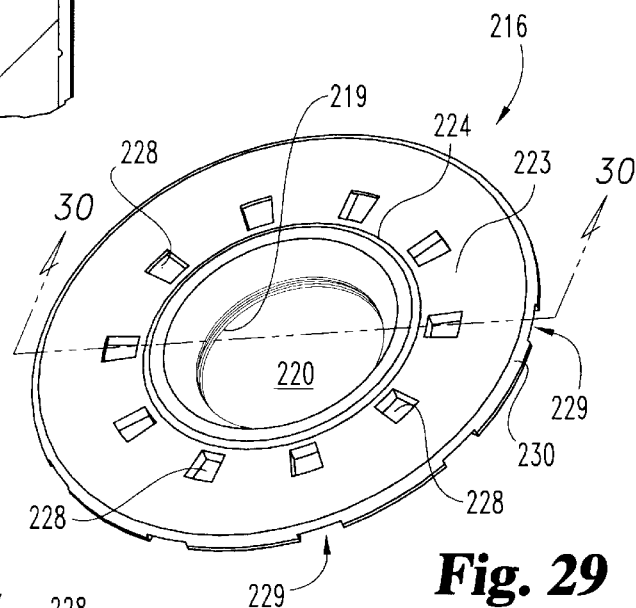
FIG. 29 is a perspective view of an inner seal comprising one portion of the FIG. 25 fluid filter.
Figure 30:
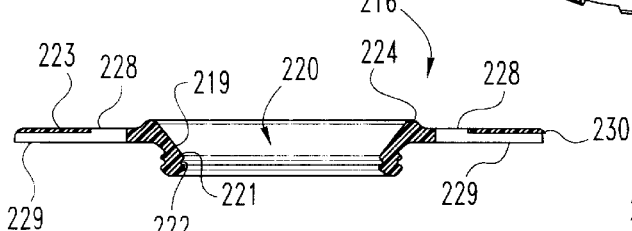
FIG. 30 is a front elevational view in full section of the FIG. 29 inner seal.

The differences between inner seal 166 and inner seal 216 is best illustrated by a comparison of FIGS. 22 and 23 versus FIGS. 29 and 30. Inner seal 216 includes an annular inner lip portion 219 which defines a substantially cylindrical inner opening 220 which is further defined by inner annular ribs 221 and 222 which are virtually identical to ribs 85 and 86 (see FIG. 7) as well as the ribs on lip portion 191. Inner seal 216 has a substantially flat upper surface 223 which is only slightly recessed below the upwardly protruding annular rib 224 which is part of the inner lip portion 219. Disposed in the annular upper surface 223 are ten equally-spaced flow openings 228. Aligned with each flow opening 228 is a corresponding radial flow channel 229 (ten total) located in the underside surface of the inner seal 216. Each flow channel 229 has a generally rectangular shape in lateral section and extends from the outer circumferential edge 230 radially inwardly until the flow channel 229 intersects the corresponding flow opening 228.

Figure 31:
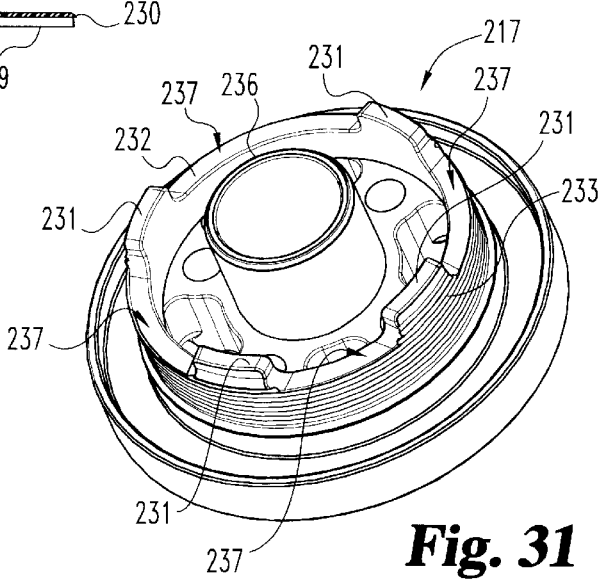
FIG. 31 is a perspective view of the underside of the FIG. 26 filter head according to the present invention.
Figure 28:
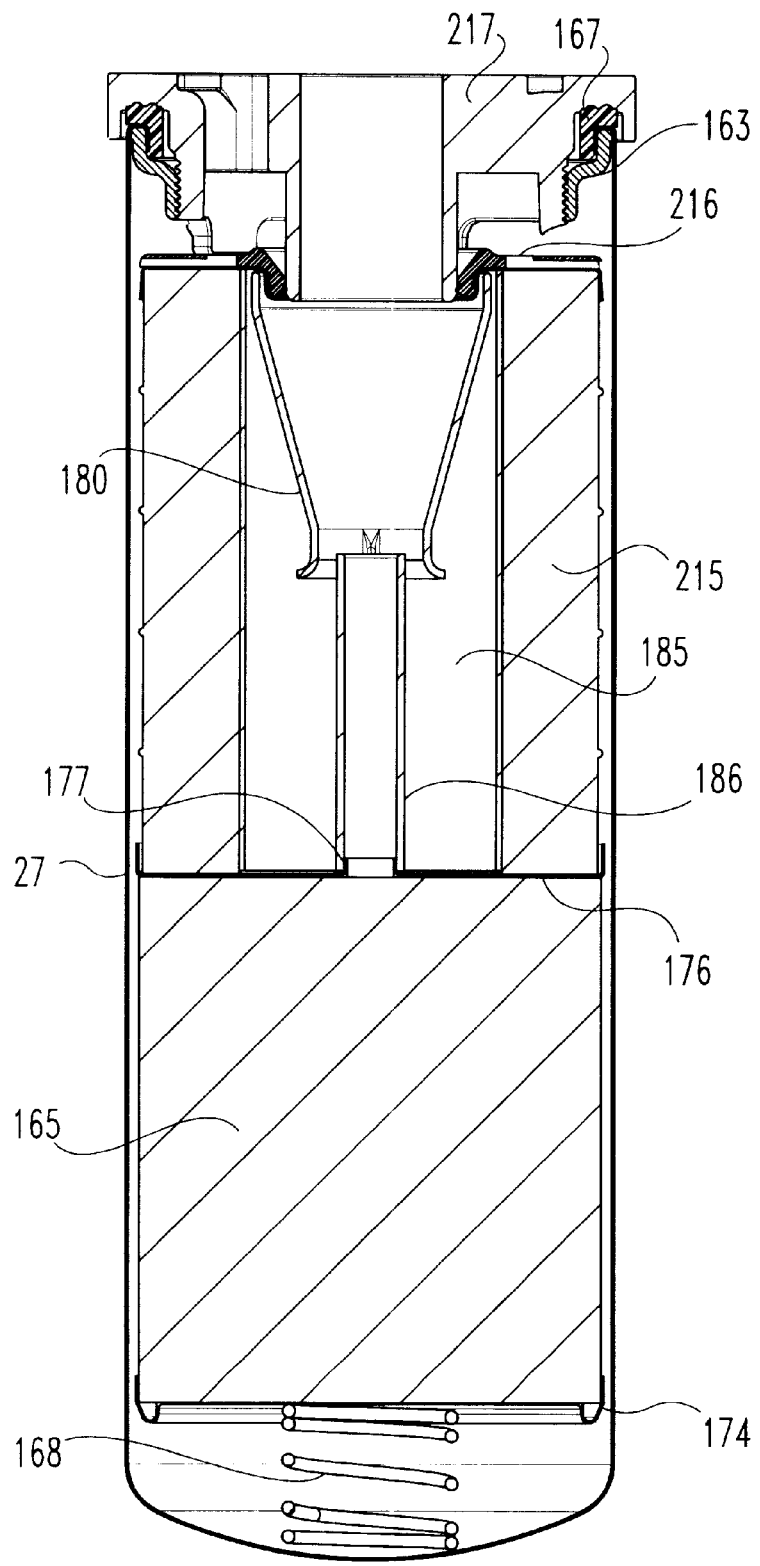
FIG. 28 is a front elevational view in full section of the FIG. 27 partial view.

With reference to FIG. 31, a perspective view of the filter head 217 is illustrated. Included as part of filter head 217, in addition to the various flow inlets and the flow outlet, are four equally-spaced projections 231 which extend down from the lower edge 232 of the externally threaded outer annular wall 233. Projections 231 are constructed and arranged to contact the upper or top surface 223 of inner seal 216 as the means of pushing the primary filtering element

164 in a downward direction so as to axially compress support spring 168. This movement of the primary filtering element 164 also moves the by-pass filtering element 165 and establishes greater clearance between the top surface 223 of the inner seal 216 and the lower edge of the nutplate. The installation sequence described for fluid filter 160 and filter head 161 of FIGS. 18–24 is essentially the same for fluid filter 215 and filter head 217 of FIGS. 25–31. The only substantive difference between these two sets of illustrations and the corresponding fluid filters and filter heads is the use of protrusion 192 and bearing surface 204 to push against the inner seal to move the primary filtering element as compared to the use of the four projections 231. The protruding stem 236 of filter head 217 is still inserted into the inner opening 220 and is sized and shaped relative to inner seal 216 so that annular ribs 221 and 222 contact the outside diameter of the protruding stem with a liquid-tight fit so as to create a sealed interface at that location.

The flow openings 228 in the inner seal 216 which connect to the flow channels 229 in the lower (bottom) surface provide a drainage flow path while maintaining a smooth surface for the head projections 231 to bear against during installation. The open spaces 237 which are positioned between each pair of adjacent projections 231 provide four radial flow paths between the filter head 217 and the inner seal 216 after installation (see FIGS. 27 and 28). Prior to fluid filter 215 installation onto filter head 217, the minimal flow clearances provided between the nutplate 163 and the inner seal 216 by openings 228 and channels 229 are adequate for drainage but not adequate to handle the full flow requirements during vehicle operation. Additional clearance areas which are adequate to handle the full flow requirements are created when the filter head pushes the inner seal away from the nutplate.

Figure 25:
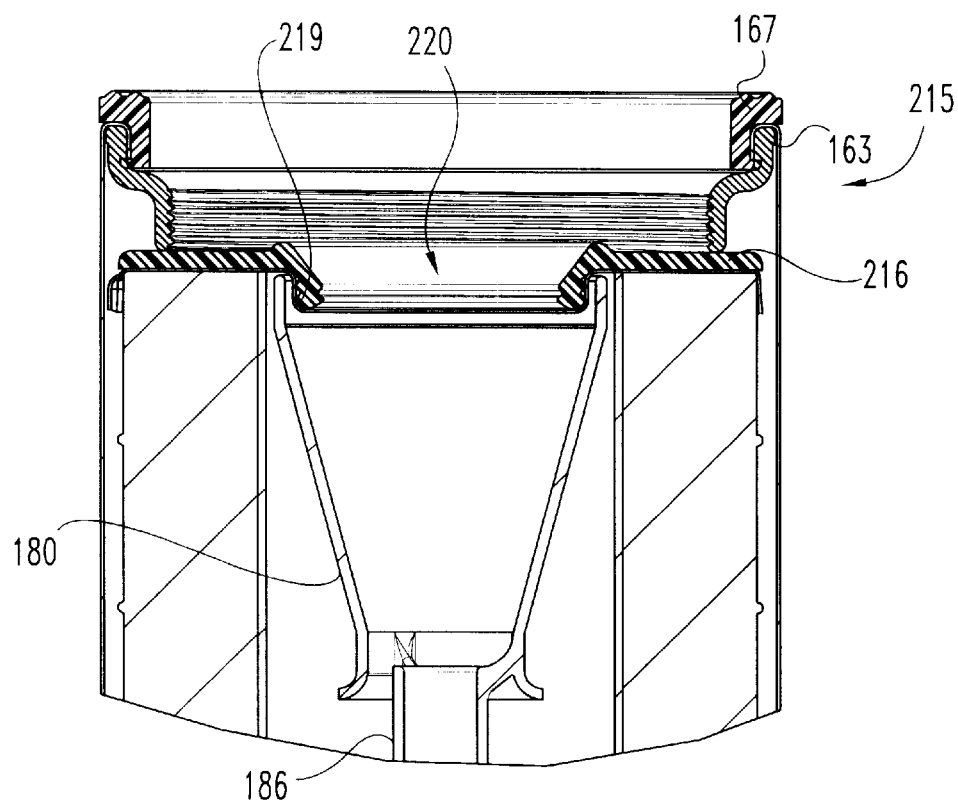
FIG. 25 is a partial front elevational view in full section of a fluid filter according to another embodiment of the present invention.
Figure 27:
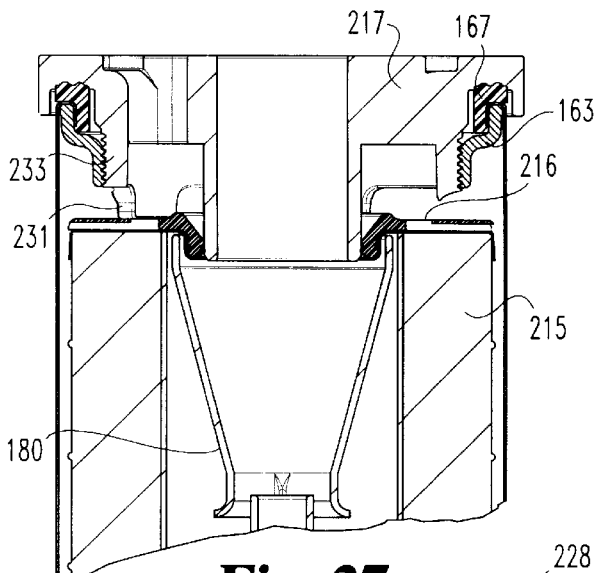
FIG. 27 is a partial, front elevational view in full section of the FIG. 25 fluid filter as assembled onto the FIG. 26 filter head according to the present invention.

If the nutplate design of FIGS. 4 and 5 (nutplate 30) or the nutplate 163 of either FIG. 18 or FIG. 25 (same basic design as nutplate 30) is used with a "solid" inner seal, such as inner seal 132, it is possible to completely block off any radial flow between the top surface of the inner seal and the lower edge of the nutplate and thereby effectively "seal" the fluid filter. If in fact inner seal 132 is used, it is important for the circumferential line of contact between the lower annular edge 73 of the nutplate 30 (or 163) to be against the upper surface of the inner seal, either radially inwardly or radially outwardly of the pockets 146. While pockets 146 do not perforate the thickness of inner seal 132, it would be possible for a flow path to be created beneath edge 73 if the nutplate 30 is located so as to circumferentially span the pockets 146. As an alternative, the pockets 146 could be eliminated or in effect filled in so that the inner seal 132 would be completely solid and provide a continuous and smooth and substantially flat top surface in order to make sealing contact with the lower edge of nutplate 30. This arrangement would create a sealed package which would even eliminate the minimal clearances as described herein and designed for drainage.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid filter assembly which is constructed and arranged to threadedly mount to a mounting base to receive a flow of incoming fluid to be filtered by a filtering element and to discharge said fluid downstream of said filtering element, said fluid filter assembly comprising:

an enclosing outer shell having an upper formed channel;

a filtering element positioned within said enclosing outer shell so as to define an annular clearance space;

a nutplate having an annular sidewall with an upper, radially outer lip which is securely anchored into said formed channel and a threaded mounting portion constructed and arranged for assembly to said mounting base, said threaded mounting portion including a lower edge, said lower edge includes a plurality of spacer tabs extending axially from said lower edge in a direction away from said upper, outer lip portion;

an inner seal positioned between said nutplate and said filtering element;

an outer seal adapted to be positioned between said mounting base and said nutplate; and wherein said flow of incoming fluid flows through a flow passageway defined by said lower edge and by said inner seal.

2. The fluid filter assembly of claim 1 wherein said inner seal has a proximal surface relative to said mounting base and wherein each spacer tab of said plurality of spacer tabs is constructed and arranged in abutting contact against the proximal surface of said inner seal.

3. The fluid filter assembly of claim 2 wherein said flow passageway is across the proximal surface of said inner seal and between two of said plurality of spacer tabs.

4. A fluid filter assembly which is constructed and arranged to threadedly mount to a mounting base to receive a flow of incoming fluid to be filtered by a filtering element and to discharge said fluid downstream of said filtering element, said fluid filter assembly comprising:

an enclosing outer shell having an upper formed channel;

a filtering element positioned within said enclosing outer shell so as to define an annular clearance space;

a nutplate having an annular sidewall with an upper, radially outer lip which is securely anchored into said formed channel and a threaded mounting portion constructed and arranged for assembly onto said mounting base, said threaded mounting portion including a lower edge;

an inner seal positioned between said nutplate and said filtering element;

an outer seal adapted to be positioned between said mounting base and said nutplate;

wherein said flow of incoming fluid flows through a flow passageway defined by said lower edge and by said inner seal; and wherein said inner seal includes a plurality of flanges and between each adjacent pair of flanges a flow opening, each of said plurality of flanges defining a corresponding proximal surface adapted to be positioned proximate said mounting base and wherein said lower edge being constructed and arranged in abutting contact against the proximal surface of each of said plurality of flanges.

5. A fluid filter assembly comprising:

a filter cartridge for filtering of fluid which is directed therethrough;

an outer shell for receipt of said filter cartridge;

a unitary nutplate which includes an annular sidewall which defines an interior opening, said annular sidewall being free of any defined flow passageways therein and including a radially outer lip portion which is constructed and arranged to be attached to said outer shell, said annular sidewall further including an internally-threaded radially inner wall portion, said outer lip portion having a radially outer surface and said inner wall portion having a radially outer surface which is positioned radially inwardly of the radially outer surface of said outer lip portion, said inner wall portion further including a lower edge; and a seal positioned between said lower edge and the filter cartridge whereby a flow passageway is defined by said lower edge and said seal.

6. The fluid filter assembly of claim 5 wherein said nutplate further includes a plurality of spacer tabs extending axially from said lower edge in a direction away from said outer lip portion.

7. The fluid filter assembly of claim 5 wherein said seal includes a plurality of flanges and between each adjacent pair of flanges a flow opening, each of said plurality of flanges defining a corresponding proximal surface relative to said unitary nutplate and wherein said lower edge being constructed and arranged in abutting contact against the proximal surface of each of said plurality of flanges.

8. The fluid filter assembly of claim 7 wherein each of said plurality of flow passageways is beneath the lower edge of said inner wall portion and between adjacent flanges of said plurality of flanges.

9. A fluid filter assembly which is constructed and arranged to threadedly mount to a mounting base to receive a flow of incoming fluid to be filtered by a filtering element and to discharge said fluid downstream of said filtering element, said fluid filter assembly comprising:

an enclosing outer shell;

a filtering element positioned within said enclosing outer shell so as to define an annular clearance space;

a nutplate assembled to said enclosing outer shell, said nutplate having an annular sidewall with a radially outer lip portion, said sidewall further defining a threaded mounting portion for assembly to said mounting base, said threaded mounting portion including a lower edge and a plurality of spacer tabs extending axially from said lower edge in a direction away from said outer lip portion, each spacer tab of said plurality of spacer tabs having an inner surface which is threaded, said sidewall being free of any defined flow openings therein;

an inner seal positioned between said nutplate and said filter element;

an outer seal adapted to be positioned between said mounting base and said nutplate; and wherein said nutplate and said inner seal cooperate to define a plurality of flow passageways for said flow of incoming fluid.

10. The fluid filter assembly of claim 9 wherein the threaded mounting portion and the threaded inner surface of each spacer tab of said plurality of spacer tabs having the same thread pitch.

11. The fluid filter assembly of claim 10 wherein said inner seal has a proximal surface adapted to be positioned proximate said mounting base and wherein each spacer tab of said plurality of spacer tabs is constructed and arranged in abutting contact against the proximal surface of said inner seal.

12. The fluid filter assembly of claim 11 wherein each flow passageway of said plurality of flow passageways is across the proximal surface of said inner seal and between adjacent spacer tabs of said plurality of spacer tabs.

13. A fluid filter assembly comprising:

a filter cartridge for filtering of fluid which is directed therethrough;

an outer shell for receipt of said filter cartridge;

a unitary nutplate which includes an annular sidewall which defines an interior opening, said annular sidewall being free of any defined flow passageways therein and including a radially outer lip portion which is constructed and arranged to be attached to said outer shell, said annular sidewall further including an internally-threaded radially inner wall portion which includes a lower edge, said nutplate further including a plurality of spacer tabs extending axially from said lower edge in a direction away from said outer lip portion, each spacer tab of said plurality of spacer tabs having an inner surface which is threaded, said outer lip portion having an outer surface and said inner wall portion having an outer surface which is positioned radially inwardly of the outer surface of said outer lip portion; and a seal positioned between said lower edge and the filter cartridge whereby a flow passageway is defined by said lower edge and said seal.

14. The fluid filter assembly of claim 13 wherein the internally-threaded radially inner wall portion and the threaded inner surface of each spacer tab of said plurality of spacer tabs having the same thread pitch.

15. The fluid filter assembly of claim 14 wherein said seal has a proximal surface facing the lower edge of said nutplate and wherein each spacer tab of said plurality of spacer tabs is constructed and arranged to have a respective free end in abutting contact against the proximal surface of said seal.

16. The fluid filter assembly of claim 15 wherein each flow passageway of said plurality of flow passageways is across the proximal surface of said seal and between adjacent spacer tabs of said plurality of spacer tabs.

17. A fluid filter assembly which is constructed and arranged to threadedly mount to a mounting base to receive a flow of incoming fluid to be filtered by a filtering element and to discharge said fluid downstream of said filtering element, said fluid filter assembly comprising:

an enclosing outer shell;

a filtering element positioned within said enclosing outer shell so as to define an annular clearance space;

a unitary nutplate assembled to said enclosing outer shell, said unitary nutplate having a sidewall which defines a threaded mounting portion for assembly to said mounting base, said sidewall being free of any defined flow openings therein;

an inner seal positioned between said nutplate and said filtering element;

an outer seal adapted to be positioned between said mounting base and said nutplate; and wherein the sidewall of said unitary nutplate includes a lower edge and said inner seal cooperates with said lower edge to define a flow passageway therebetween, said lower edge includes a plurality of spacer tabs extending axially from said lower edge in a direction toward said inner seal, each spacer tab of said plurality of spacer tabs having an inner surface which is threaded.

18. The fluid filter assembly of claim 17 wherein the threaded mounting portion and the threaded inner surface of each spacer tab of said plurality of spacer tabs having the same thread pitch.

19. The fluid filter assembly of claim 18 wherein said inner seal has a proximal surface adapted to be positioned proximate said mounting base and wherein each spacer tab of said plurality of spacer tabs is constructed and arranged in abutting contact against the proximal surface of said inner seal.

20. The fluid filter assembly of claim 19 wherein said flow passageway is across the proximal surface of said inner seal and between two of said plurality of said spacer tabs.

* * * * *

UNITED STATES PATENT AND TRADEMARK OFFICE
CERTIFICATE OF CORRECTION

PATENT NO : 5,996,810
DATED : December 7, 1999
INVENTOR(S) : Alan S. Bounnakhom, et al.

It is certified that error appears in the above-identified patent and that said Letters Patent is hereby corrected as shown below:

In Col. 17, at line 26, insert -- radially -- after "threaded".

Signed and Sealed this

Twentieth Day of March, 2001

Attest:

NICHOLAS P. GODICI

Attesting Officer     Acting Director of the United States Patent and Trademark Office